United States Patent
Boduch et al.

(10) Patent No.: US 10,128,971 B2
(45) Date of Patent: Nov. 13, 2018

(54) MULTI WAVELENGTH ROUTING PLANE OPTICAL ARCHITECTURE

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

(*) Notice: Subject to any disclaimer, the term of this patent is extended or adjusted under 35 U.S.C. 154(b) by 0 days.

(21) Appl. No.: 15/701,998

(22) Filed: Sep. 12, 2017

(65) Prior Publication Data

US 2018/0076918 A1    Mar. 15, 2018

Related U.S. Application Data

(60) Provisional application No. 62/393,885, filed on Sep. 13, 2016.

(51) Int. Cl.
| | |
|---|---|
| *H04J 14/02* | (2006.01) |
| *H04B 10/66* | (2013.01) |
| *H04B 10/50* | (2013.01) |

(52) U.S. Cl.
CPC .......... *H04J 14/021* (2013.01); *H04B 10/506* (2013.01); *H04B 10/66* (2013.01); *H04J 14/0204* (2013.01); *H04J 14/0205* (2013.01)

(58) Field of Classification Search
CPC ...... H04B 10/506; H04B 10/66; H04J 14/021
See application file for complete search history.

(56) References Cited

U.S. PATENT DOCUMENTS

| | | | |
|---|---|---|---|
| 9,008,514 B2 | 4/2015 | Boduch et al. | |
| 9,276,695 B2 | 3/2016 | Boduch et al. | |
| 9,374,186 B1 | 6/2016 | Boduch et al. | |
| 9,667,374 B2 | 5/2017 | Boduch et al. | |
| 2014/0147121 A1* | 5/2014 | Matsukawa | H04J 14/0204 398/83 |
| 2014/0294394 A1* | 10/2014 | Lee | H04J 14/0213 398/83 |
| 2015/0055952 A1* | 2/2015 | Younce | H04J 14/0212 398/48 |
| 2015/0280854 A1* | 10/2015 | Matsukawa | H04J 14/022 398/3 |
| 2017/0047993 A1* | 2/2017 | Huang | H04B 10/0775 |

* cited by examiner

*Primary Examiner* — Dzung Tran

(57) ABSTRACT

Example embodiments of the present invention relate to a multi wavelength-routing-plane optical architecture. Example embodiments include a Reconfigurable Optical Add Drop Multiplexer (ROADM) supporting a multi wavelength-routing-plane optical architecture, and optical networks supporting a multi wavelength-routing-plane optical architecture.

5 Claims, 15 Drawing Sheets

MULTI WAVELENGTH ROUTING PLANE OPTICAL ARCHITECTURE

RELATED APPLICATION

This application claims the benefit of: U.S. Provisional Application No. 62/393,885, filed on Sep. 13, 2016.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

SUMMARY

Figure 1:
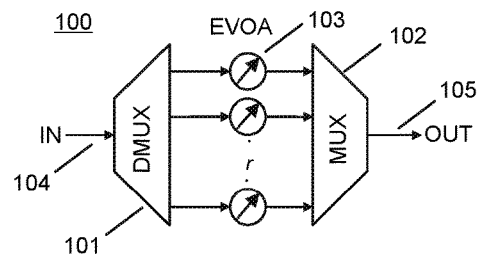
FIG. 1 is an illustration of a wavelength equalizer.

A wavelength division multiplexed (WDM) optical node typically comprises two or more optical degrees. In the past, the interface and optical circuitry of a single optical degree was placed on a single circuit pack. For such implementations, a large number of optical cables are required between each of the single circuit packs in order to create a fully interconnected optical node. Optical integration and innovation now allows for the placement of multiple optical degrees on a single circuit pack. In order to create larger optical nodes from such circuit packs, one may either optically interconnect the circuit packs (like in the past), or one may operate each of the individual circuit packs as a separate optical plane. For the latter case, the optical cables between the circuit packs is no longer needed, thus simplifying the installation and maintenance of optical nodes built in this manner. This invention focuses on optical nodes and optical networks built using the concept of using optical planes.

One embodiment of the present invention is an optical node, comprising, a first Reconfigurable Optical Add Drop Multiplexer (ROADM), wherein the first ROADM comprises a first optical degree, a second optical degree, a first common add port used to add wavelengths to the first optical degree and to the second optical degree. The optical node further comprises a second ROADM, wherein the second ROADM comprises a third optical degree, a fourth optical degree, a second common add port used to add wavelengths to the third optical degree and to the fourth optical degree, and wherein the second ROADM is not optically connected to the first ROADM. The optical node further comprises a first optical multiplexer, wherein the first optical multiplexer comprises a first wavelength multiplexer, a first plurality of add ports, and a first multiplexer common port connected to the first common add port. The optical node further comprises a second optical multiplexer, wherein the second optical multiplexer comprises a second wavelength multiplexer, a second plurality of add ports, and a second multiplexer common port connected to the second common add port. The optical node further comprises a first and a second transmitter, wherein the first transmitter is connected to one port of the first plurality of add ports and emits a first optical wavelength with a first data payload, and wherein the second transmitter is connected to one port of the second plurality of add ports and emits a second optical wavelength with a second data payload, wherein the second data payload is a copy of the first data payload.

The first plurality of add ports may be numbered, and the second plurality of add ports may be numbered. The first transmitter and second transmitters may be connected to the same port number of their respective optical multiplexers. Alternatively, the first transmitter and second transmitters may be connected to different port numbers of their respective optical multiplexers.

The first optical transmitter may emit the first optical wavelength using a first wavelength frequency, and the second optical transmitter may emit the second optical wavelength using a second wavelength frequency. The second wavelength frequency may be the same as the first wavelength frequency, or the second wavelength frequency may be different from the first wavelength frequency.

The first ROADM of the optical node may further comprise a first wavelength equalizer having only one optical input and only one optical output, and used to pass and block individual wavelengths from the first optical degree to the second optical degree. The first ROADM of the optical node may further comprise a second wavelength equalizer having only one optical input and only one optical output, and used to pass and block individual wavelengths from the second optical degree to the first optical degree. The first ROADM of the optical node may further comprise a third wavelength equalizer having only one optical input and only one optical output, and used to pass and block individual wavelengths from the first common add port to the first optical degree. The first ROADM of the optical node may further comprise a fourth wavelength equalizer having only one optical input and only one optical output, and used to pass and block individual wavelengths from the first common add port to the second optical degree.

Another embodiment of the present invention is an optical node wherein the optical node comprises an m number of Reconfigurable Optical Add Drop Multiplexers (ROADMs), wherein the m number of ROADMs are not optically connected to each other. Each of the m number of ROADMs may comprise a first optical degree, a second optical degree, a common add port used to add wavelengths to the first optical degree and to the second optical degree. The optical node further comprises an m number of optical multiplexers, each paired with one of the m number of ROADMs, and each comprising: a wavelength multiplexer, a k number of add ports, and a multiplexer common port connected to the common add port of an optical multiplexer's paired ROADM. The optical node further comprises a p number of transmitter protection pairs, wherein a first transmitter of a transmitter protection pair is optically connected to one port of the k number of add ports of one of the m number of optical multiplexers, and wherein a second transmitter of the transmitter protection pair is optically connected to one port of the k number of add ports of another one of the m number of optical multiplexers. The transmitters may be connected to the m number of optical multiplexers so as to maximize the p number of transmitter protection pairs.

A method of connecting optical transmitters to wavelength routing planes within an optical node with an odd integer number of wavelength routing planes is presented. The method comprises connecting a first optical transmitter of a transmitter protection pair to a first wavelength routing plane, wherein the first wavelength routing plane is the wavelength routing plane having the most available add ports. The method further comprises connecting a second optical transmitter of the transmitter protection pair to a second wavelength routing plane, wherein the second wavelength routing plane is different from the first wavelength routing plane, and wherein the second wavelength routing plane is the wavelength routing plane having the most available add ports of any wavelength routing plane not including the first wavelength routing plane. The method further comprises configuring the first optical transmitter to emit a first wavelength of a first wavelength frequency, and configuring the second optical transmitter to emit a second wavelength of a second wavelength frequency, wherein the second wavelength frequency is different from the first wavelength frequency.

DETAILED DESCRIPTION

This invention generally focuses on building a wavelength routing plane using directionless Reconfigurable Optical Add Drop Multiplexers (ROADM), and specifically focuses on building such ROADMs using wavelength equalizers that can be easily manipulated to provide customized functions. FIG. 1 is an illustration of a wavelength equalizer 100 comprising of; a wavelength demultiplexer (DMUX) 101 that is used to separate a composite Wavelength Division Multiplexed (WDM) signal arriving at input 104 into r number of individual wavelengths, a plurality of Electrical Variable Optical Attenuators (EVOAs) 103 used to partially or fully attenuate the individual wavelengths, and a wavelength multiplexer (MUX) 102 that is used to combine r number of individual wavelengths into a composite Wavelength Division Multiplexed (WDM) signal for transmission at output 105. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

The device 100 is referred to as a wavelength equalizer because the EVOAs 103 can be used to equalize the power levels of all the wavelengths inputted into the device. Therefore, if wavelengths with unequal power levels are applied to input 104, the EVOAs can be configured so that the wavelengths exiting at 105 have substantially the same optical power level with respect to one another. The device 100 is also often referred to as a wavelength blocker, or as a one-by-one wavelength selective switch, or as simply a wavelength switch.

Figure 2:
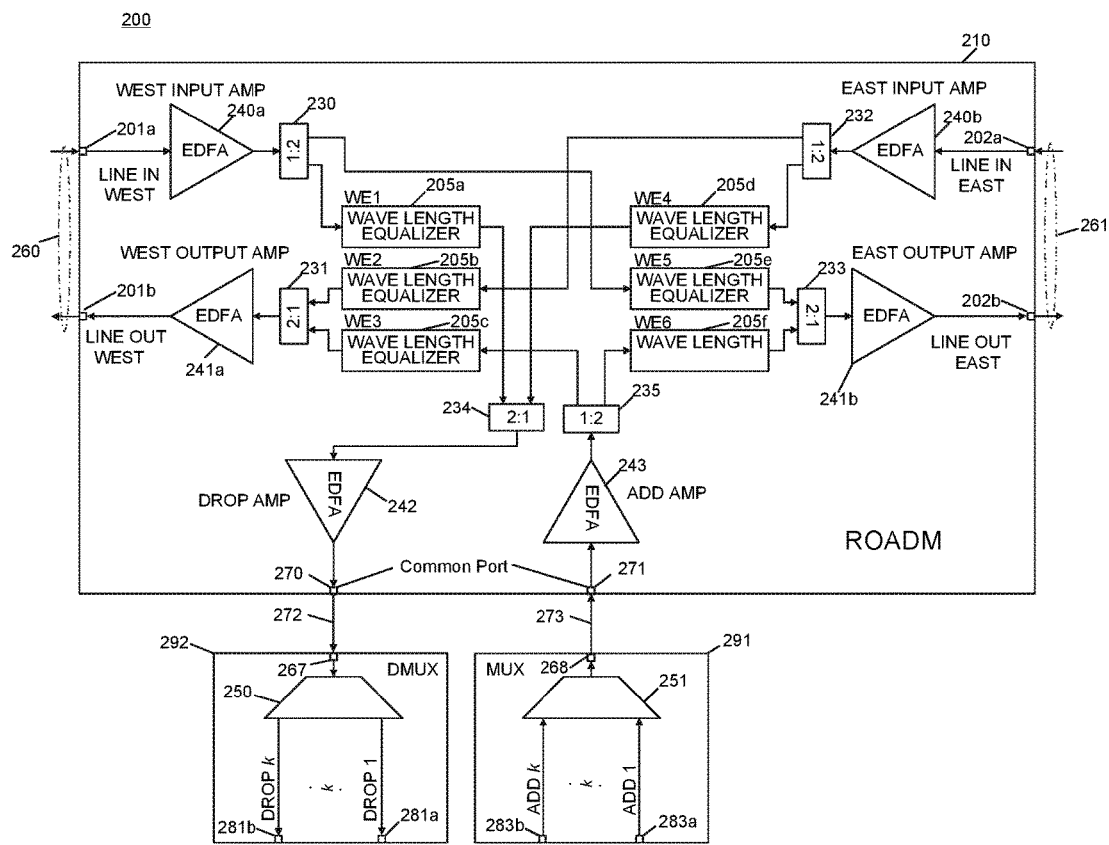
FIG. 2 is an illustration of an optical node comprising of a two degree Reconfigurable Optical Add Drop Multiplexer (ROADM) with an optical multiplexer and an optical demultiplexer.

FIG. 2 shows an optical node 200 comprising of a two-degree Reconfigurable Optical Add Drop Multiplexer (ROADM) 210 with an optical multiplexer 291 and an optical demultiplexer 292. The ROADM 210 comprises: a first optical degree 260 (comprising a first optical degree input port 201a, and a first optical degree output port 201b), a second optical degree 261 (comprising a second optical degree input port 202a, and a second optical degree output port 202b), a common port (comprising a common drop port 270, and a common add port 271), a first optical degree input optical amplifier 240a, a first optical degree output optical amplifier 241a, a second optical degree input optical amplifier 240b, a second optical degree output optical amplifier 241b, a common drop port optical amplifier 242, a common add port optical amplifier 243, a set (group) of wavelength equalizers 205a-f, one-to-two optical couplers 230, 232, & 235, and two-to-one optical couplers 231, 233, & 234. The optical multiplexer 291 comprises a wavelength multiplexer 251, a multiplexer common port 268, and a plurality (k) of add ports 283a-b. The optical demultiplexer 292 comprises a wavelength demultiplexer 250, a demultiplexer common port 267, and a plurality (k) of drop ports 281a-b.

When placed within an optical network, the interfaces of the optical degrees may be labeled using geographic naming nomenclature. Therefore, for the case wherein the first optical degree 260 is facing the West geographic location, the first optical degree input port 201a may be referred to as the "Line In West" optical interface, and the first optical degree output port 201b may be referred to as the "Line Out West" optical interface. Similarly, for the case wherein the second optical degree 261 is facing the East geographic location, the second optical degree input port 202a may be referred to as the "Line In East" optical interface, and the second optical degree output port 202b may be referred to as the "Line Out East" optical interface, as shown in FIG.2.

Each line optical interface on the ROADM (Line In/Out West 201a-b, and Line In/OUT East 202a-b) represents an optical degree 260 and 261. In addition, optical node 200 contains a port common to both optical degrees. The common port comprises of a common add port 271 and a common drop port 270. The common port is connectable to a plurality of directionless add/drop ports 283a-b and 281a-b. Six wavelength equalizers 205a-f are used—three for each degree. Wavelength equalizer WE1 205a is used to either pass or block wavelengths from the West Line interface 201a to the wavelength demultiplexer 250 attached to the common drop port 270. Similarly, wavelength equalizer WE4 205d is used to either pass or block wavelengths from the East Line interface 202a to the wavelength demultiplexer 250 attached to the common drop port 270. The wavelengths from WE1 205a and WE4 205d are combined together using optical coupler 234, and then they are forwarded to the wavelength demultiplexer 250 via optional optical amplifier 242 through the common drop port 270.

Wavelength equalizer WE3 205c is used to either pass or block wavelengths from the common add port 271 to the West Line interface 201b. It is also used to equalize the power levels of the wavelengths exiting out the West Line interface 201b from the wavelength multiplexer 251. Similarly, wavelength equalizer WE6 205f is used to either pass or block wavelengths from the common add port 271 to the East Line interface 202b. It is also used to equalize the power levels of the wavelengths exiting out the East Line interface 202b from the wavelength multiplexer 251.

Wavelength equalizer WE2 205b is used to either pass or block wavelengths from the East Line interface 202a to the West Line interface 201b. It is also used to equalize the power levels of the wavelengths exiting out the West Line interface 201b from the East Line interface 202a. Similarly, wavelength equalizer WE5 205e is used to either pass or block wavelengths from the West Line interface 201a to the East Line interface 202b. It is also used to equalize the power levels of the wavelengths exiting out the East Line interface 202b from the West Line interface 201a.

Optional input optical amplifiers 240a-b are used to optically amplify wavelengths arriving from the West 201a and East 202a Line interfaces. These amplifiers can be constructed using Erbium Doped Fiber Amplifier (EDFA) technology or some other suitable technology.

Optical coupler 230 is used to broadcast all the wavelengths from the West Line interface 201a to both wavelength equalizer WE1 205a and WE5 205e. Similarly, optical coupler 232 is used to broadcast all the wavelengths from the East Line interface 202a to both wavelength equalizer WE2 205b and WE4 205d.

Optical coupler 231 is used to combine the wavelengths from wavelength equalizers WE2 205b and WE3 205c into one composite WDM signal that is optically amplified with output optical amplifier 241a. Similarly, optical coupler 233 is used to combine the wavelengths from wavelength equalizers WE5 205e and WE6 205f into one composite WDM signal that is optically amplified with output optical amplifier 241b.

Optional optical amplifier 243 receives added wavelengths from the wavelength multiplexer 251 via port 271, and optically amplifies the wavelengths before forwarding the amplified wavelengths to optical coupler 235. Optical coupler 235 is used to broadcast the added wavelengths to both the West Line interface 201b and East Line interface 202b via WE3 205c and WE6 205f respectively.

Connected to the wavelength multiplexer 251 is a plurality (k) of add ports 283a-b. Individual wavelengths are added to the wavelength multiplexer 251 and then multiplexed into a composite WDM signal that is then forwarded to the ROADM 210. Connected to the wavelength demultiplexer 250 is a plurality (k) of drop ports 281a-b. In the drop direction, a composite WDM signal is received from the common drop port 270 of the ROADM 210 and then it is demultiplexed into individual wavelengths using wavelength demultiplexer 250. Each demultiplexed wavelength is then forwarded to a specific drop port 281a-b of the wavelength demultiplexer. The wavelength multiplexer and wavelength demultiplexer may be implemented using Arrayed Waveguide Grating (AWG) technology, or some other suitable technology. Devices that process individual wavelengths for transmission—such as optical transponders—can be used to supply and receive wavelengths to and from the add ports and drop ports. The common add port 271 of the ROADM 210 is connected to the multiplexer common port 268 using a first optical jumper 273. The common drop port 270 of the ROADM 210 is connected to the demultiplexer common port 267 using a second optical jumper 272.

As can be seen in 200, a single wavelength multiplexer and a single wavelength demultiplexer are used to add and drop wavelengths to and from both the East and West Line interfaces. Therefore, a transponder that is attached to an add port of the wavelength multiplexer and to a drop port of the wavelength demultiplexer can forward and receive wavelengths to and from either of the two optical degrees of the ROADM. Because of this, the add/drop ports are referred to as directionless add/drop ports (i.e., directionless add ports and directionless drop ports)—meaning the add/drop ports are not dedicated to a particular optical degree of the optical node. The wavelength equalizers on the ROADM circuit pack are used to steer the added and dropped wavelengths to and from each optical degree by appropriately blocking or passing wavelengths. Therefore, the wavelength equalizers WE1 205a, WE3 205c, WE4 205d, and WE6 205f are said to perform directionless steering for the add/drop ports for each optical degree.

Additionally, the wavelength equalizers on the ROADM 210 are used to select which wavelengths from the Line input interfaces are allowed to exit a given output interface (common drop port, optical degree), by appropriately blocking or passing wavelengths.

The ROADM 210 may be placed on a first circuit pack, and the wavelength multiplexer 251 and wavelength demultiplexer 250 (along with the add ports 283a-b and drop ports 281a-b) may be placed on a second circuit pack. The first circuit pack and the second circuit pack may contain electrical connectors that allow the two circuit packs to be plugged into an electrical back plane of an electrical shelf (not shown). The circuit pack comprising the wavelength multiplexer and wavelength demultiplexer may contain active components (i.e., components requiring electrical power in order to operate), or it may contain only passive components (athermal AWGs, for example). If the circuit pack comprising the wavelength multiplexer and wavelength demultiplexer contains only passive components, then the circuit pack comprising the wavelength multiplexer and wavelength demultiplexer could optionally be placed outside of the electrical shelf.

Figure 3:
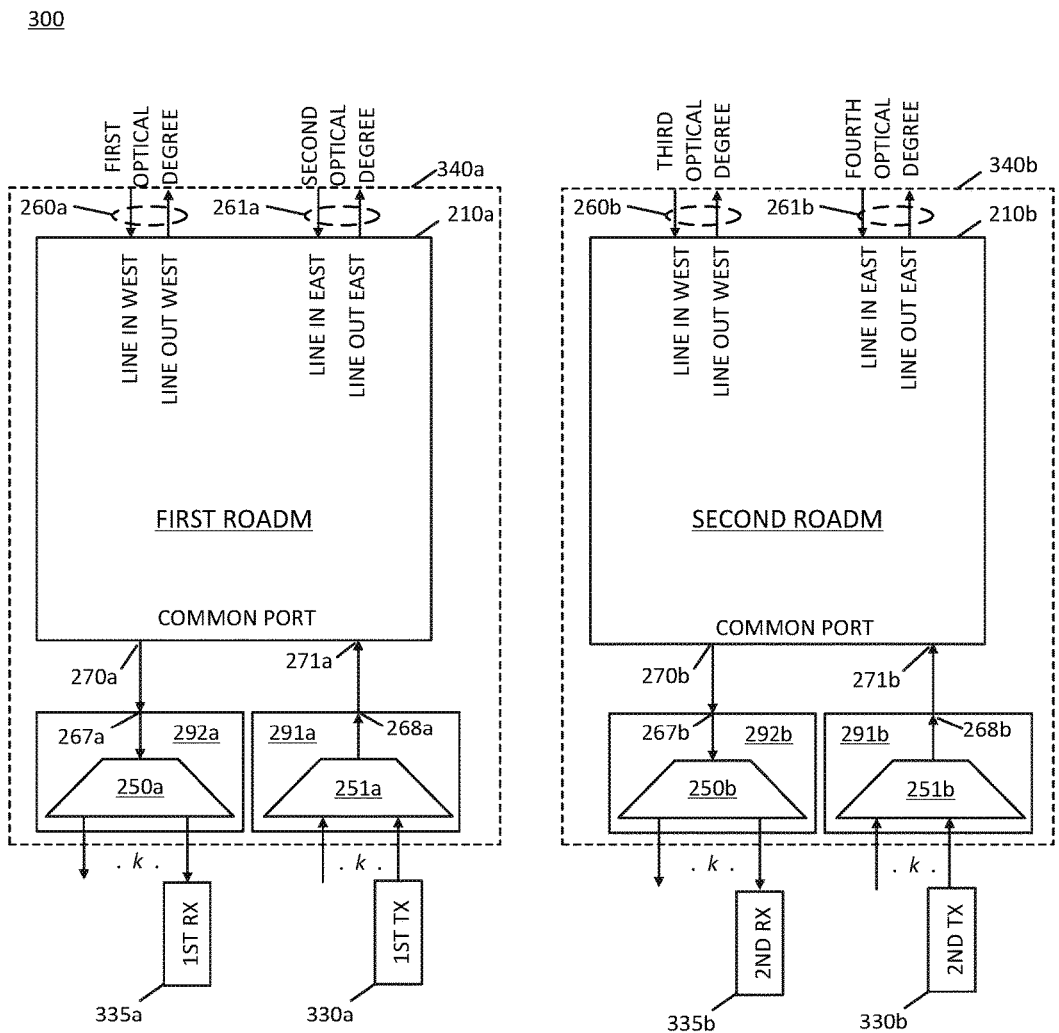
FIG. 3 is an illustration of an optical node with two wavelength routing planes.

The combination of optical elements 200 comprising the ROADM 210, the optical multiplexer 291, and the optical demultiplexer 292 can be referred to as a wavelength routing plane. One may use the ROADM 210 and the optical multiplexer 291 and optical demultiplexer 292 to construct a simple two-degree optical node having k number of optical add/drop ports 283a-b, 281a-b. However, one sometimes requires equipment redundancy. For this case, two or more of the ROADMs may be placed within a single optical node (with each ROADM being placed on a separate circuit pack). Such a configuration 300 is shown in FIG. 3. FIG. 3 shows an optical node 300 comprising: a first wavelength routing plane 340a, a second wavelength routing plane 340b, a first optical transmitter 330a, a second optical transmitter 330b, a first optical receiver 335a, and a second optical receiver of the 335b. The first wavelength routing plane comprises: a first ROADM 210a, a first optical multiplexer 291a, and a first optical demultiplexer 292a. Similarly, the second wavelength routing plane comprises: a second ROADM 210b, a second optical multiplexer 291b, and a second optical demultiplexer 292b. The first ROADM 210a and the second ROADM 210b can be the same as—for example—the ROADM 210 shown in FIG. 2, although they are not limited thereto. The first ROADM 210a comprises a first optical degree 260a, a second optical degree 261a, and a common port comprising a first common add port 271a and a first common drop port 270a. Similarly, second ROADM 210b comprises a third optical degree 260b, a fourth optical degree 261b, and a second common port comprising a second common add port 271b and a second common drop port 270b. The first optical multiplexer 291a comprises a first wavelength multiplexer 251a, a first plurality of k add ports connected to the first wavelength multiplexer 251a, and a first multiplexer common port 268a connected to the first wavelength multiplexer 251a. The first optical demultiplexer 292a comprises a first wavelength demultiplexer 250a, a first plurality of k drop ports connected to the first wavelength demultiplexer 250a, and a first demultiplexer common port 267a connected to the first wavelength demultiplexer 250a. The second optical multiplexer 291b comprises a second wavelength multiplexer 251b, a second plurality of k add ports connected to the second wavelength multiplexer 251b, and a second multiplexer common port 268b connected to the second wavelength multiplexer 251b. The second optical demultiplexer 292b comprises a second wavelength demultiplexer 250b, a first plurality of k drop ports connected to the second wavelength demultiplexer 250b, and a second demultiplexer common port 267b connected to the second wavelength demultiplexer 250b. The first common drop port 270a is connected to the first demultiplexer common port 267a with an optical fiber jumper cable, and the first common add port 271a is connected to the first multiplexer common port 268a with a second optical fiber jumper cable, and the second common drop port 270b is connected to the second demultiplexer common port 267b with a third optical fiber jumper cable, and the second common add port 271b is connected to the second multiplexer common port 268b with a fourth optical fiber jumper cable.

The first optical multiplexer 291a and the second optical multiplexer 291b can be the same as—for example—the optical multiplexer 291 shown in FIG. 2, although they are not limited thereto. The first optical demultiplexer 292a and the second optical demultiplexer 292b can be the same as—for example—the optical multiplexer 292 shown in FIG. 2, although they are not limited thereto.

The first common add port is used to add wavelengths to the first optical degree and to the second optical degree, while the second common add port is used to add wavelengths to the third optical degree and the fourth optical degree. Wavelengths are added to the first optical degree 260a from the first common add port 271a by configuring the wavelength equalizer 205c residing between the first common add port 271a and Line Out West port of the first optical degree 260a to pass the desired wavelengths while blocking the undesired wavelengths. Wavelengths are added to the second optical degree 261a from the first common add port 271a by configuring the wavelength equalizer 205f residing between the first common add port 271a and the Line Out East port of the second optical degree 261a to pass the desired wavelengths while blocking the undesired wavelengths. Wavelengths are added to the third optical degree 260b from the second common add port 271b by configuring the wavelength equalizer 205c residing between the second common add port 271b and the Line Out West port of the third optical degree 260b to pass the desired wavelengths while blocking the undesired wavelengths. Wavelengths are added to the fourth optical degree 261b from the second common add port 271b by configuring the wavelength equalizer 205f residing between the second common add port 271b and the Line Out East port of the fourth optical degree 261b to pass the desired wavelengths while blocking the undesired wavelengths. Wavelengths that are applied to the k number of add ports of the first optical multiplexer 291a are multiplexed into one composite wavelength division multiplexed signal by wavelength multiplexer 251a. This composite wavelength division multiplexed signal is then forwarded to the first common add port 271a of the first ROADM 210a. Wavelengths that are applied to the k number of add ports of the second optical multiplexer 291b are multiplexed into one composite wavelength division multiplexed signal by wavelength multiplexer 251b. This composite wavelength division multiplexed signal is then forwarded to the second common add port 271b of the second ROADM 210b.

The first transmitter 330a is connected to one port of the first plurality of add ports of the first optical multiplexer 291a. The first transmitter 330a emits a first optical wavelength with a first data payload. The second transmitter 330b is connected to one port of the second plurality of add ports of the second optical multiplexer 291b. The second transmitter 330b emits a second optical wavelength with a second data payload, wherein the second data payload is a copy of the first data payload. In addition, since the first optical wavelength is routed through the first ROADM, and the second optical wavelength is routed through the second ROADM, the second optical wavelength may be the same wavelength (i.e., the same frequency) as the first optical wavelength, but it does not have to be the same wavelength.

It should be noted from 300 in FIG. 3 that the first ROADM is not optically coupled to the second optical ROADM, as there are no optical fiber jumper cables directly connecting the first ROADM 210a to the second ROADM 210b. Because there are no optical fiber jumper cables directly connecting the first ROADM 210a to the second ROADM 210b, installation of the two ROADMs is quicker and less prone to error. The optical node also operates with higher reliability, as there are less points of failure.

The first optical degree and the second optical degree and the third optical degree and the fourth optical degree may be attached to four independent entry points of an optical network. Since two copies of the same data payload are applied to two separate wavelength routing planes 340a and 340b, if one wavelength routing plane fails, then at least one copy of the data payload is able to reach its destination point within the optical network.

Figure 4:
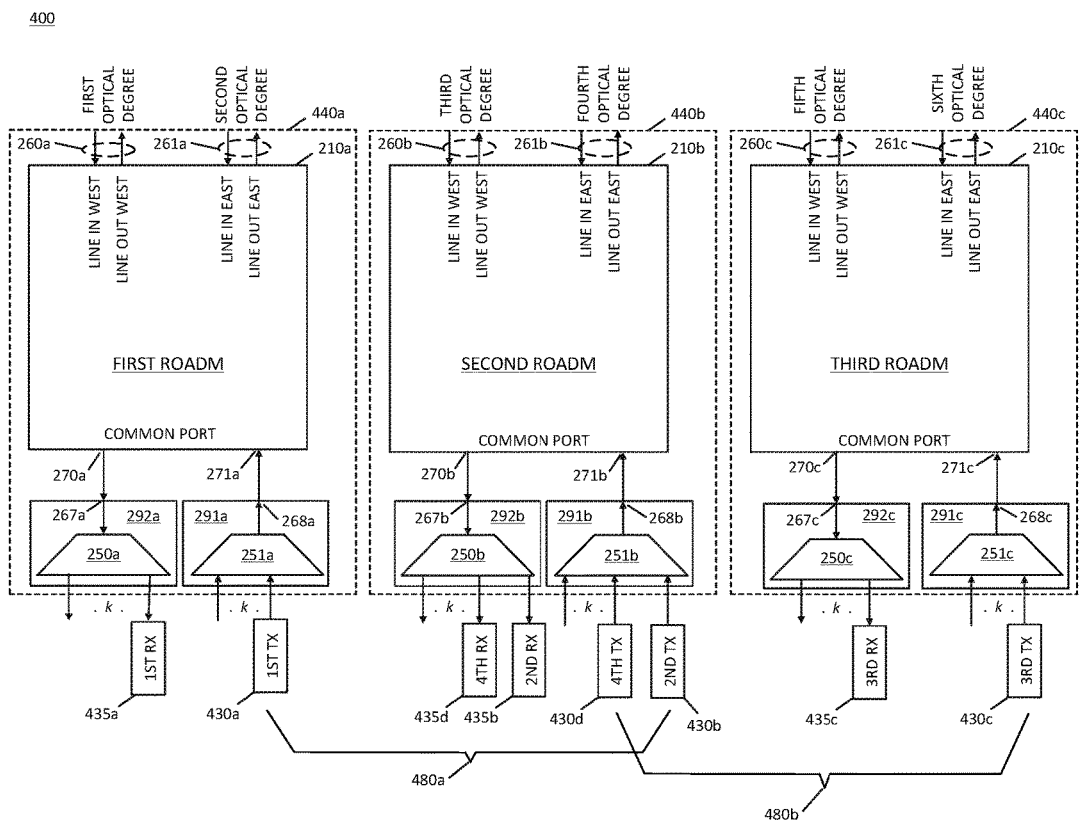
FIG. 4 is an illustration of an optical node with three wavelength routing planes.

For the optical node 300, there are no choices with regard to where the two transmitters should be placed within the optical node, as in order to avoid a single point of failure, one transmitter must be attached to one wavelength routing plane, and the other transmitter must be attached to the other wavelength routing plane. FIG. 4 shows an optical node 400 that is identical to optical node 300 except that optical node 400 has an additional wavelength routing plane 440c, and also has additional transmitters and receivers—namely: 430c, 435c, 430d, and 435d. For the optical node 400, the first transmitter 430a is connected to one port of the first plurality of add ports of the first optical multiplexer 291a of the first wavelength routing plane 440a. The first transmitter 430a emits a first optical wavelength with a first data payload. The second transmitter 430b is connected to one port of the second plurality of add ports of the second optical multiplexer 291b of the second wavelength routing plane 440b. The second transmitter 430b emits a second optical wavelength with a second data payload, wherein the second data payload is a copy of the first data payload. The first optical degree and the second optical degree and the third optical degree and the fourth optical degree and the fifth optical degree and the sixth optical degree may be attached to six independent entry points of an optical network. Since two copies of the same data payload are applied to two separate wavelength routing planes 440a and 440b, if one wavelength routing plane fails, then at least one copy of the data payload is able to reach its destination point within the optical network.

The third transmitter 430c emits a third optical wavelength with a third data payload, and the fourth transmitter 430d emits a fourth optical wavelength with a fourth data payload, wherein the fourth data payload is the same as the third data payload. For optical node 400, we can then state that the first transmitter and the second transmitter form a first transmitter protection pair (from a data payload perspective), while the third transmitter and the fourth transmitter form a second transmitter protection pair. The first transmitter within a transmitter protection pair is connected to a first wavelength routing plane, and the second transmitter within a transmitter protection pair is connected to second wavelength routing plane, wherein the second wavelength routing plane is different from the first wavelength routing plane.

When the third transmitter 430c and the third receiver 435c and the fourth transmitter 430d and the fourth receiver 435d are placed into the optical node 400, unlike the case of optical node 300, there is a choice of where to place the additional transmitters and receivers. Since there are now three wavelength routing planes (440a, 440b and 440c), the third transmitter may be placed in the first wavelength routing plane 440a, while placing the fourth transmitter in either the second wavelength routing plane 440b or the third wavelength routing plane 440c. Alternatively, the third transmitter may be placed in the second wavelength routing plane 440b, while placing the fourth transmitter in either the first wavelength routing plane 440a or the third wavelength routing plane 440c. Or alternatively still, the third transmitter may be placed in the third wavelength routing plane 440c, while placing the fourth transmitter in either the first wavelength routing plane 440a or the second wavelength routing plane 440b. In order to maximize the number of transmitter protection pairs within an optical node, the transmitters are spread across the three optical planes as evenly as possible. Therefore, since the first transmitter 430a was previously attached to the first wavelength routing plane 440a, and since the second transmitter 430b was previously attached to the second wavelength routing plane 440b, the third transmitter 430c is placed in the third wavelength routing plane 440c (as shown in FIG. 4). Then when placing the fourth transmitter 430d into the optical node 400, the fourth transmitter (which is paired with the third transmitter 430c) may be placed in either the first wavelength routing plane 440a or the second wavelength routing plane 440b, since both the first wavelength routing plane 440a and the second wavelength routing plane each have only one transmitter prior to the insertion of the fourth transmitter into optical node 400.

Figure 5:
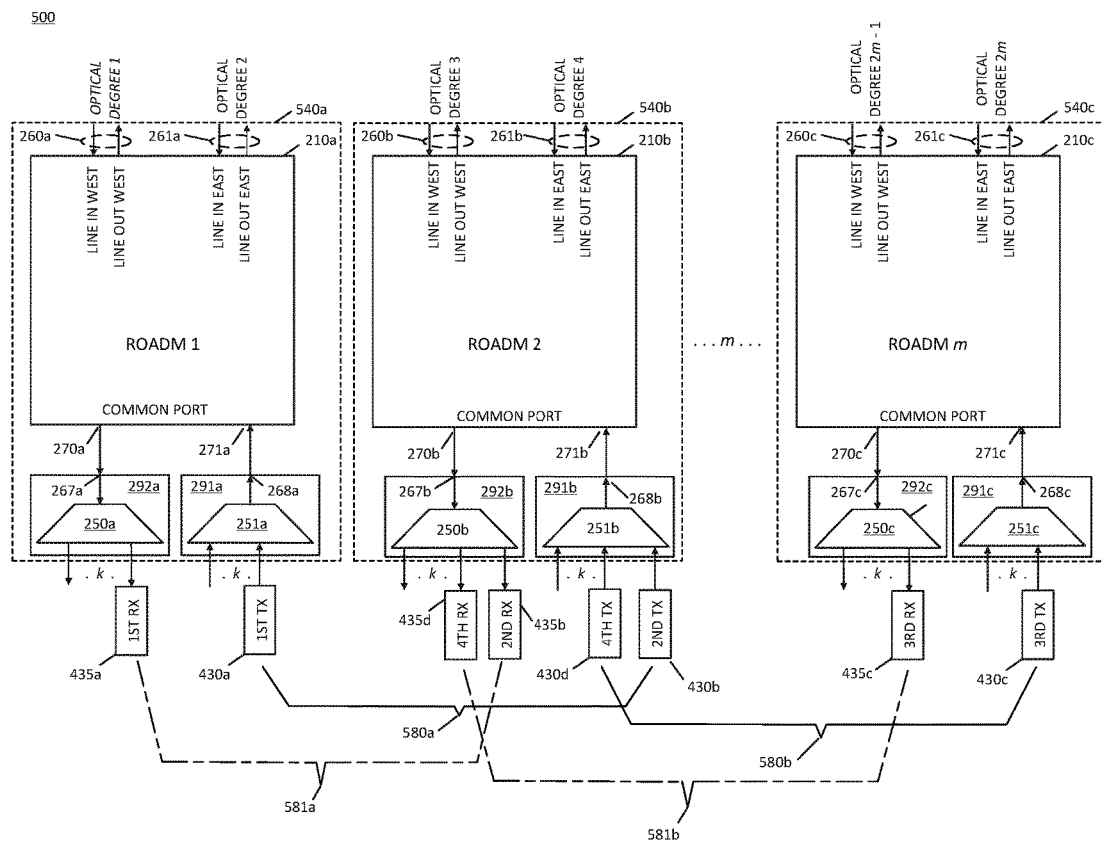
FIG. 5 is an illustration of an optical node with m wavelength routing planes.

FIG. 5 depicts and optical node 500 comprising: an m number of ROADMS 210a-c, each comprising a first optical degree 260a-c, a second optical degree 261a-c, a common add port 271a-c used to add wavelengths to the first optical degree and the second optical degree, and a common drop port 270a-c used to drop wavelengths from the first optical degree and the second optical degree, wherein the m number of Reconfigurable Optical Add Drop Multiplexers are not optically connected to each other. The optical node 500 additionally comprises an m number of optical multiplexers 291a-c, each paired with one of the m number of Reconfigurable Optical Add Drop Multiplexers, and each comprising: a wavelength multiplexer 251a-c, a k number of add ports, and a multiplexer common port 268a-c connected to the common add port 271a-c of its paired Reconfigurable Optical Add Drop Multiplexer. The optical node 500 additionally comprises an m number of optical demultiplexers 292a-c, each paired with one of the m number of Reconfigurable Optical Add Drop Multiplexers, and each comprising: a wavelength demultiplexer 250a-c, a k number of drop ports, and a demultiplexer common port 267a-c connected to the common drop port 270a-c of its paired Reconfigurable Optical Add Drop Multiplexer. The optical node 500 additionally comprises a p number of transmitter protection pairs (wherein p=2 in FIG. 5), wherein for all transmitter protection pairs a first transmitter 430a of a transmitter protection pair 580a is optically connected to one port of the k number of add ports of one of the m number of optical multiplexers, and wherein a second transmitter 430b of the transmitter protection pair 580a is optically connected to one port of the k number of add ports of another one of the m number of optical multiplexers, and wherein transmitters are connected to the m number of optical multiplexers so as to maximize the p number of transmitter protection pairs.

Optical node 500 comprises of m wavelength routing planes 540a-c. Each routing plane comprises a ROADM 210a-c, an optical multiplexer 291a-c, and an optical demultiplexer 292a-c. There are no direct optical interconnections between the m wavelength routing planes. The optical node 500 further comprises a p number of transmitter protection pairs 580a-b (i.e., a plurality of transmitter protection pairs), and a p number of receiver protection pairs 581a-b (i.e., a plurality of receiver protection pairs). Each transmitter protection pair comprises a first transmitter 430a, 430c and a second transmitter 430b, 430d. Each receiver protection pair comprises a first receiver 435a, 435c and a second receiver 435b, 435d. The data payload transmitted by the second transmitter 430b of the first transmitter protection pair 580a is the same as the data payload transmitter by the first transmitter 430a of the first transmitter protection pair 580a, and the data payload transmitted by the second transmitter 430d of the second transmitter protection pair 580b is the same as the data payload transmitter by the first transmitter 430c of the second transmitter protection pair 580b. Similarly, the data payload received by the second receiver 435b of the first receiver protection pair 581a is the same as the data payload received by the first receiver 435a of the first receiver protection pair 581a, and the data payload received by the second receiver 435d of the second receiver protection pair 581b is the same as the data payload received by the first receiver 435c of the second receiver protection pair 581b.

The optical degree 1, optical degree 2, optical degree 3, optical degree 4, optical degree 2m-1, and optical degree 2m may be attached to m independent entry points of an optical network. Since two copies of the same data payload are applied to two separate wavelength routing planes, if one wavelength routing plane fails, then at least one copy of the data payload is able to reach its destination point within the optical network.

Protection Pair Port Assignment

Figure 6:
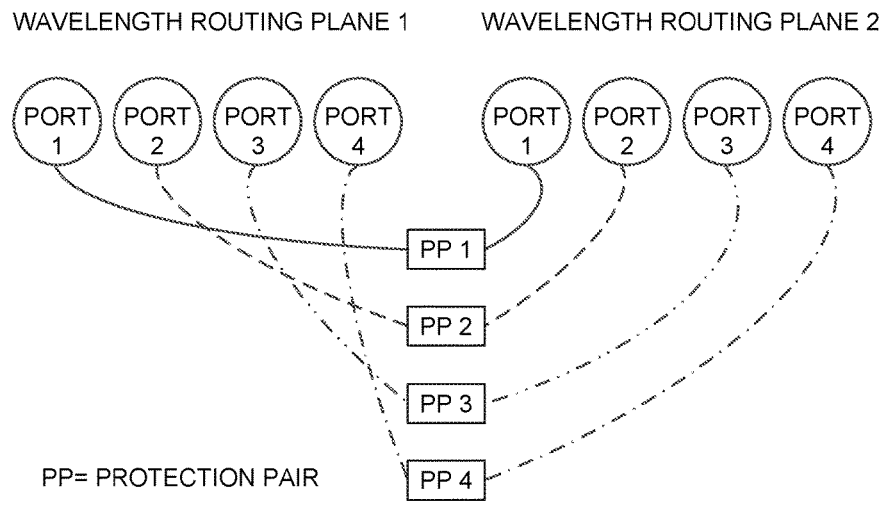
FIG. 6 is an illustration of a protection pair port assignment for an optical node having two wavelength routing planes, with each wavelength routing plane having 4 add/drop ports.

If there is an even number of wavelength routing planes within an optical node (i.e., m is an even integer), then assigning ports to protection pairs (PP) can be straight forward. In one scenario, groups of two wavelength routing planes may always be paired together. Such a case is shown in FIG. 6, wherein two wavelength routing planes each comprise of four add/drop ports. For this case 600, port i of wavelength routing plane 1 may always be paired with port i of wavelength routing plane 2, wherein i=1 to 4. If the optical multiplexers 291a-c and optical demultiplexers 292a-c are colorless multiplexers and demultiplexers (i.e., each port can be of any network supported wavelength), then the port i to port i type of port assignment shown in FIG. 6 should be able to be used regardless of the port numbers available at the far end of the connections. This is because each port of each wavelength routing plane can be tuned to any of the available wavelengths at the far end of the connections. If, however, the optical multiplexers 291a-c and optical demultiplexers 292a-c are colored multiplexers and demultiplexers (i.e., each port is assigned a specific dedicated wavelength), then it may not be possible to perform the port i of wavelength routing plane 1 to port i wavelength routing plane 2 mapping as shown in FIG. 6. This is especially true if the far end optical node contains an odd number of wavelength routing planes. In such a case, for example, the far end node may only have port 3 (using wavelength 3) of wavelength routing plane 1 available, and the far end node may only have port 2 (using wavelength 2) of wavelength routing plane 2 available, and the far end node may only have port 1 (using wavelength 1) of wavelength routing plane 3 available (as depicted in 1000 of FIG. 10). Therefore, for this case, even if all four ports were available in both wavelength routing planes of 600, in order to create a protection pair, the port number used in wavelength routing plane 2 of 600 would need to be different than the port number used in wavelength routing plane 1 within 600.

In order to maximize the number of ports used within a given optical node under any given connection scenario, one should allow the assignment of different wavelengths to the two ports of a protection pair. For the case of when the optical multiplexer and optical demultiplexer comprise of colored ports, this means that one should allow the assignment of different port numbers to the two ports of a protection pair. If this is done, then the number of transmitter protection pairs p used within a given optical node is maximized when $p=\lfloor (m \times k)/2 \rfloor$, wherein m is equal to the ROADMs (or wavelength routing planes) and wherein k equals the number of add ports of the optical multiplexer attached to each of the ROADMs, and wherein m>1, and wherein k>0, and wherein $\lfloor f \rfloor$ is the floor function. For the port assignment of 600 shown in FIG. 6, $p=\lfloor (2 \times 4)/2 \rfloor=4$.

Figure 7A:
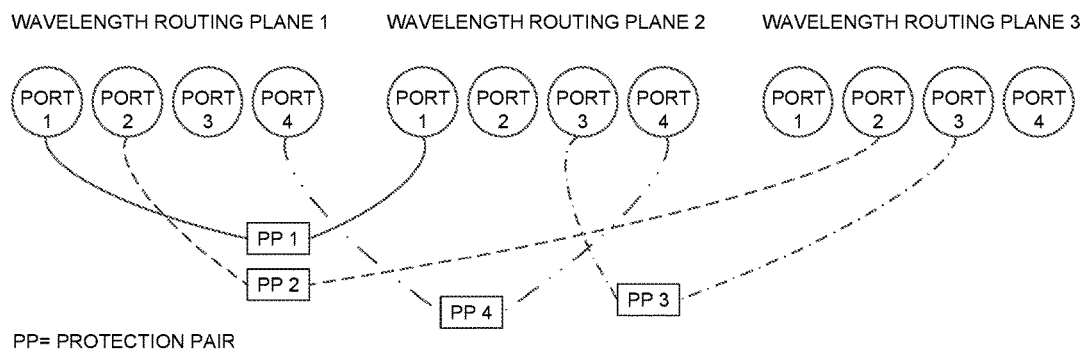
FIG. 7A is an illustration of a protection pair port assignment for an optical node having three wavelength routing planes, with each wavelength routing plane having 4 add/drop ports.

Within an optical node populated with colored optical multiplexers (with each optical multiplexer having the same number of ports and the same wavelength frequencies), if there is an odd number of wavelength routing planes (i.e., m is an odd integer), then without allowing the second transmitter of a transmitter protection pair to transmit a different wavelength than the first transmitter of a transmitter protection pair, it's not possible to achieve the maximized number of protection transmitter pairs as defined by $p=\lfloor (m \times k)/2 \rfloor$. This is because there will always be a k number of transmitters that are unable to be paired. An example of this is shown by the port assignment of 700 shown in FIG. 7A. In 700, there are three wavelength routing planes, each having four colored ports, wherein the wavelength frequency of port i of wavelength routing plane 1 is equal to the wavelength frequency of port i of wavelength routing plane 2 and wavelength routing plane 3 for all of i 1 to 4, and wherein the wavelength frequency of port i of wavelength routing plane 2 is equal to the wavelength frequency of port i of wavelength routing plane 3 for all of i 1 to 4. For port assignment algorithm of 700, only ports with the same wavelength frequency are allowed to be pair. The algorithm used for pairing always pairs the wavelength routing planes having the most available (i,e., unassigned) ports, giving precedence to the lowest numbered wavelength routing plane when two or more wavelength routing planes have the same number of available ports, and always giving priority to the lowest numbered port of a given wavelength routing plane when multiple ports are available within a given wavelength routing plane. Therefore, as shown in 700, port 1 of wavelength routing plane 1 is first paired with port 1 of wavelength routing plane 2. Then port 2 of wavelength routing plane 1 is paired with port 2 of wavelength routing plane 3. Then port 3 of wavelength routing plane 2 is paired with port 3 of wavelength routing plane 3. Then port 4 of wavelength routing plane 1 is paired with port 4 of wavelength routing plane 2. After that, what's left are k number of ports that are unable to be paired—namely port 3 of wavelength routing plane 1, port 2 of wavelength routing plane 2, and ports 1 and 4 of wavelength routing plane 3. Note: the algorithm described to assign ports in 700 assumes that there are no connection conflicts at the far-end nodes that prevent the assignments dictated by the said algorithm. That is to say, port 1 of wavelength routing plane 1 is able to be connected to port 1 of wavelength routing plane 1 at the far end node, and port 1 of wavelength routing plane 2 is able to be connected to port 1 of wavelength routing plane 2 at the far end node, and port 2 of wavelength routing plane 1 is able to be connected to port 2 of wavelength routing plane 1 at the far end node, and port 2 of wavelength routing plane 3 is able to be connected to port 2 of wavelength routing plane 3 at the far end node, and port 3 of wavelength routing plane 2 is able to be connected to port 3 of wavelength routing plane 2 at the far end node, and port 3 of wavelength routing plane 3 is able to connect to port 3 of wavelength routing plane 3 at the far end node, and port 4 of wavelength routing plane 1 is able to be connected to port 4 of wavelength routing plane 1 at the far end node, and port 4 of wavelength routing plane 2 is able to be connected to port 4 of wavelength routing plane 2 at the far end node. Therefore, as can be seen, the maximum number of protection pairs p in an optical node with an odd number of wavelength routing planes having colored add ports that are not allowed to be paired with add ports of differing wavelength frequencies is equal to the maximum number of protection pairs in the optical node (i.e., (m×k)/2) minus the number of unconnectable pairs due to an odd number of wavelength routing planes (i.e., k/2) or $$p = \frac{m \times k}{2} - \frac{k}{2},$$

which is equal to $$p = \frac{k(m-1)}{2},$$

which is also equal to the maximum number of protection pairs in an optical node having one less wavelength routing plane (the m−1 wavelength routing plane) and an even number of wavelength routing planes. (Note: there is no need to include the floor function for an even number a wavelength routing planes.) So, there is not much advantage to adding an additional plane to an optical node with an even number of planes unless pairing is allowed between unlike port numbers and unlike wavelength frequencies. This assumes that a given optical node has the same type of add/drop ports (colored or colorless) in each of its wavelength routing planes. This also assumes that each wavelength routing plane has the same number of add/drop ports within a given optical node. For the case of where an optical node comprises of colored add/drop ports, it is assumed that the number of add/drop ports within a given wavelength routing plane is equal to the total number of Wavelength Division Multiplexed (WDM) wavelengths supported by the optical network. For the case of where an optical node comprises of colorless add/drop ports, it is assumed that the number of add/drop ports within a given wavelength routing plane may be less than the total number of Wavelength Division Multiplexed (WDM) wavelengths supported by the optical network.

Figure 7B:
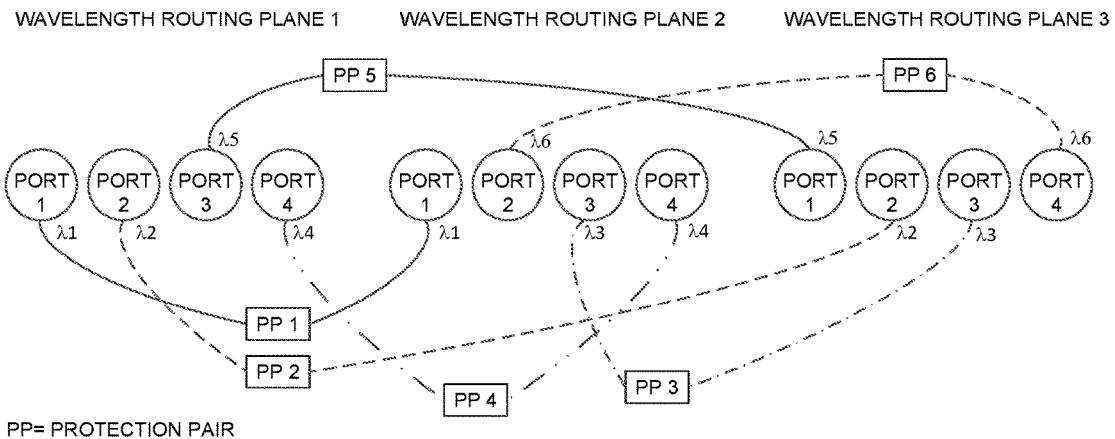
FIG. 7B is an illustration of a protection pair port assignment for an optical node having three wavelength routing planes, with each wavelength routing plane having 4 add/drop ports.

If an optical network comprises of three wavelength routing planes (each with four colorless add/drop ports), and if the total number of wavelengths supported by the optical network is four, and the protection pair port assignment policy is assign the two ports within a protection pair the same wavelength and the same port number, except that the wavelength used by any given protection pair may be any of the four wavelengths, then the assignment shown in 700 results (i.e., there are k add/drop ports that are unable to be assigned to protection pairs). If an optical network comprises of three wavelength routing planes (each with four colorless add/drop ports), and if the total number of wavelengths supported by the optical network is four, and the protection pair port assignment policy is assign the two ports within a protection pair the same wavelength, but not necessarily the same port number, then k add/drop ports within the optical node across the three wavelength routing planes will not be able to be assigned to any protection pairs. This is because there will always be a k number of wavelength frequencies that cannot be paired with like wavelength frequencies. If an optical network comprises of three wavelength routing planes (each with four colorless add/drop ports), and if the total number of wavelengths supported by the optical network is four, and the protection pair port assignment policy is assign the two ports within a protection pair the same port number, but not necessarily the same wavelength number, then k add/drop ports within the optical node across the three wavelength routing plane will not be able to be assigned to any protection pairs because there will always be a k number of ports that can't be paired with like numbered ports. If an optical network comprises of three wavelength routing planes (each with four colorless add/drop ports), and if the total number of wavelengths supported by the optical network is at least six, and the protection pair port assignment policy is assign the two ports within a protection pair the same wavelength, but not the same port number, then all add/drop ports within the optical node across the three-wavelength routing plane will be able to be assigned to protection pairs. One such assignment is shown in 750 of FIG. 7B, wherein six different wavelengths are utilized (λ1 to λ6). In general, at a minimum, for an optical node having an odd number of wavelength routing planes each having k colorless ports, and having a protection pair port assignment policy of allowing the two ports within a port protection pair (receiver or transmitter pairs) to be attached to different port numbers but must use the same wavelength frequency, a minimum of $$k + \frac{k}{2} = 3k/2$$

wavelengths are required in order to assign all km add/drop ports to protection pairs (assuming no far end node connection conflicts, and assuming m>1).

Figure 8:
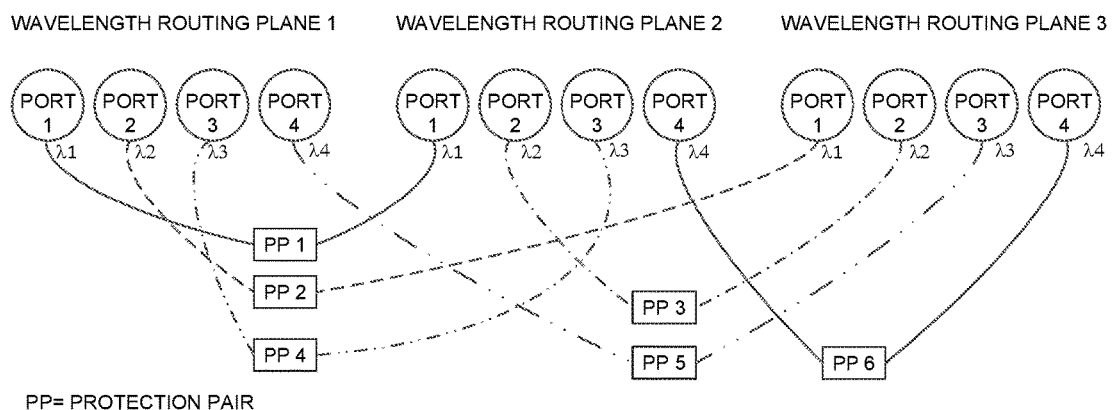
FIG. 8 is an illustration of a protection pair port assignment for an optical node having three wavelength routing planes, with each wavelength routing plane having 4 add/drop ports.

For the case wherein the number of add/drop ports k is equal to the number of WDM wavelengths frequencies available within the optical network, if one is allowed to assign different port numbers and different wavelength frequencies to two ports within an optical node comprising of an odd number of wavelength routing planes, then it's possible to maximize the number of add/drop ports within a given optical node to transmitter protection pairs and receiver protection pairs according to the equation $p=\lfloor(m\times k)/2\rfloor$, assuming that they are no far end optical node conflicts (i.e., there are available wavelength frequencies at the far end nodes that match the available wavelength frequencies at the near end nodes) and no optical fiber conflicts (i.e., there are enough usable and available wavelengths on fibers between the near end optical node and the far end optical node). FIG. 8 depicts the protection pair port assignment 800 wherein the same optical node as in 700 is able to assign both different optical port numbers and different wavelength frequencies to two ports (add and drop ports) of the same protection pair (transmitter protection pair and receiver protection pair). In 800, for Protection Pair 1 (PP1), Protection Pair 3 (PP3), Protection Pair 4 (PP4), and Protection Pair 6 (PP6) both the port number and wavelength frequency is the same for both ports within the protection pair, while this is not the case for Protection Pair 2 (PP2), and Protection Pair 5 (PP5). In general, in all cases, it is assumed that the two add ports used by the two transmitters within a transmitter protection pair are the same as the two drop ports used by the corresponding two receivers within a protection pair within a given optical node (for a bidirectional connection), and it is assumed that the two wavelength frequencies used by the two transmitters within a transmitter protection pair are the same as the wavelength frequencies used by the corresponding two receivers within a protection pair within a given optical node (for a bidirectional connection). The ports in 800 may either be colored or colorless add/drop ports.

Figure 9:
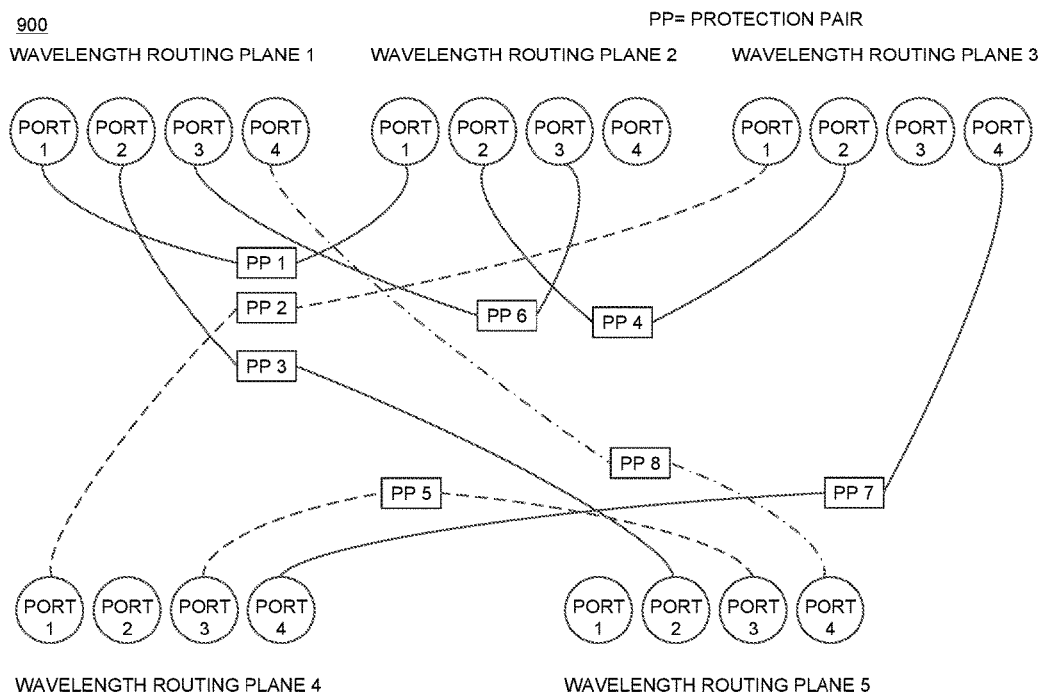
FIG. 9 is an illustration of a protection pair port assignment for an optical node having five wavelength routing planes, with each wavelength routing plane having 4 add/drop ports.

FIG. 9 illustrates a protection pair port assignment 900 of an optical node with five wavelength routing planes (m=5) each having four add/drop ports (k=4), wherein the assignment policy (assignment rules) does not allow the two ports within the same protection pair to be assigned to two different port numbers and to be assigned two different wavelength frequencies. If the policy was changed so as to allow the two ports within the same protection pair to be assigned to two different port numbers and to be assigned two different wavelength frequencies, then port 4 of wavelength routing plane 2 could be paired with port 3 of wavelength routing plane 3, and port 2 of wavelength routing plane 4 could be paired with port 1 of wavelength routing plane 5. It should be noted that for the case wherein the assignment policy (assignment rules) does not allow the two ports within the same protection pair to be assigned to two different port numbers and to be assigned two different wavelength frequencies, as the number of wavelength routing planes within an optical node increases, the percentage of ports that can't be assigned to a protection pair goes down, if k remains constant. This is observed when comparing the protection pair port assignment of 700 to the protection pair port assignment of 900. In 700 33% (4/12) of the ports cannot be assigned to protection pairs, while in 900 only 20% (4/20) of the ports cannot be assigned to protection pairs.

Figure 10:
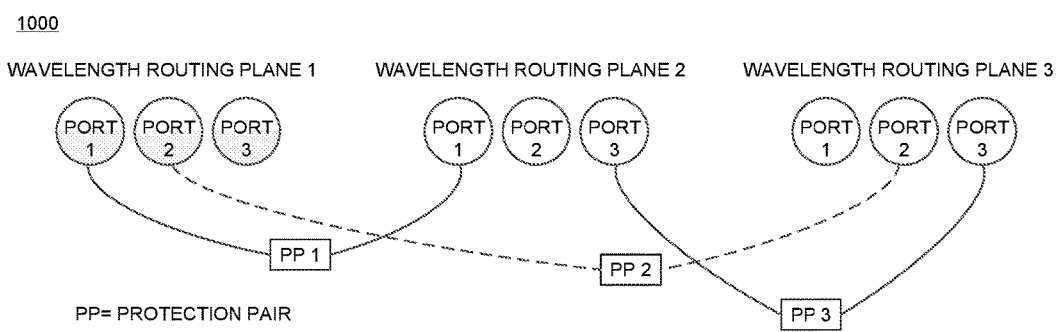
FIG. 10 is an illustration of a protection pair port assignment for an optical node having three wavelength routing planes, with each wavelength routing plane having 3 add/drop ports.

FIG. 10 illustrates a protection pair port assignment 1000 of an optical node with three wavelength routing planes (m=3) each having three add/drop ports (k=3), wherein the assignment policy (assignment rules) does not allow the two ports within the same protection pair to be assigned to two different port numbers and to be assigned two different wavelength frequencies. It should be noted that for the case wherein the assignment policy (assignment rules) does not allow the two ports within the same protection pair to be assigned to two different port numbers and to be assigned two different wavelength frequencies, as the number of ports within the wavelength routing planes within an optical node increases (while holding the number of wavelength routing panes constant), the percentage of ports that can't be assigned to a protection pair remains constant. This is observed when comparing the protection pair port assignment of 700 to the protection pair port assignment of 1000. In 700 33% (4/12) of the ports cannot be assigned to protection pairs, and in 1000 33% (3/9) of the ports cannot be assigned to protection pairs.

Figure 11:
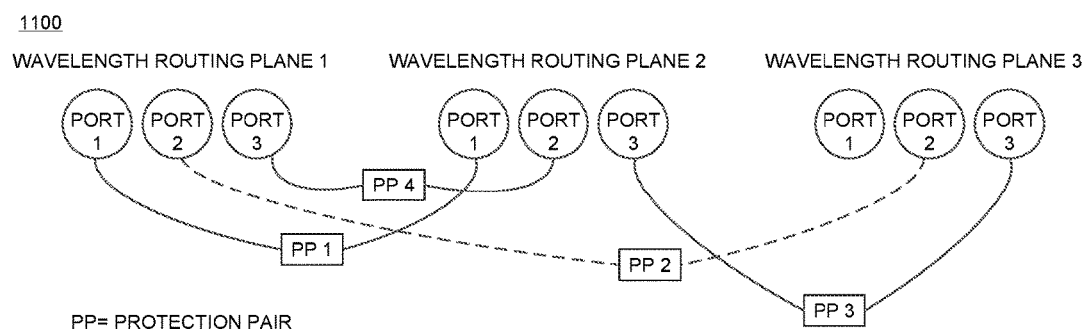
FIG. 11 is an illustration of a protection pair port assignment for an optical node having three wavelength routing planes, with each wavelength routing plane having 3 add/drop ports.

FIG. 11 illustrates the case 1100 wherein all ports cannot be assigned to a protection pair even if the assignment policy (assignment rules) allows the two ports within the same protection pair to be assigned to two different port numbers and to be assigned two different wavelength frequencies. This is because the port total km for the optical node is an odd number of ports, so it is impossible to pair one port within the optical node to another port within the optical node. Therefore, in general the maximum possible number of protection pairs within an optical node uses the floor function (i.e., $p=\lfloor (m \times k)/2 \rfloor$), wherein m>1, and wherein k>0. An odd number of total add/drop ports within a system results whenever both m and k are odd integers.

It can be noted that the various wavelength routing planes within a given optical node may support differing amounts of optical degrees. For example, a given optical node may comprise of a first wavelength routing plane with a ROADM having two optical degrees, a second wavelength routing plane with a ROADM having three optical degrees, a third wavelength routing plane with a ROADM having three optical degrees, and a fourth wavelength routing plane with a ROADM having four optical degrees.

Additionally, each wavelength routing plane within an optical node may comprise of optical multiplexers and optical demultiplexers with varying amounts of add/drop ports and differing types of add/drop ports. For example, a given optical node may comprise of a first wavelength routing plane having an optical multiplexer with 32 colored add ports and an optical demultiplexer with 32 colored drop ports, a second wavelength routing plane having an optical multiplexer with 32 colored add ports and an optical demultiplexer with 32 colored drop ports, a third wavelength routing plane having an optical multiplexer with 8 colorless add ports and an optical demultiplexer with 8 colorless drop ports, and a fourth wavelength routing plane having an optical multiplexer with 8 colorless add ports and an optical demultiplexer with 8 colorless drop ports.

Figure 12:
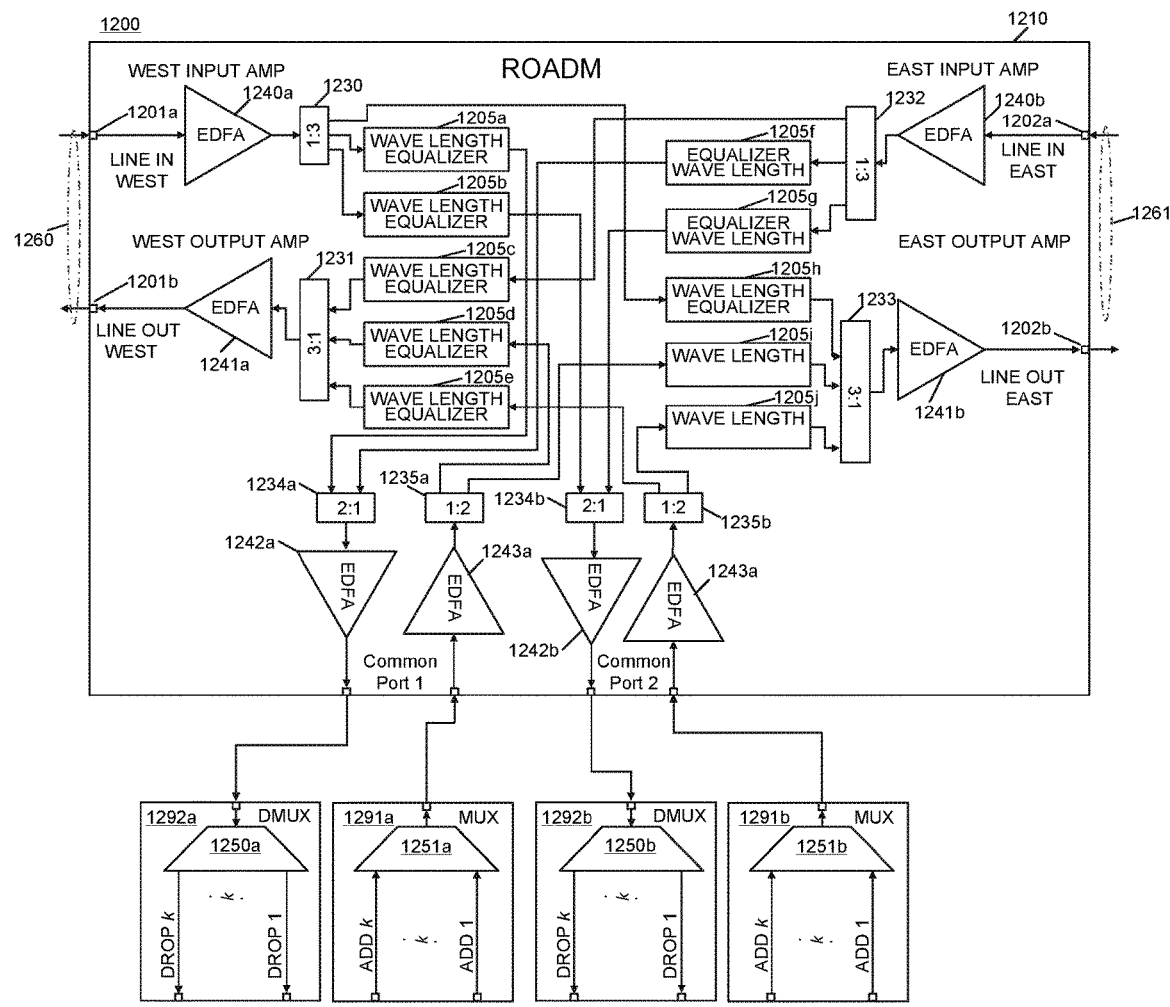
FIG. 12 is an illustration of an optical node comprising of a two degree Reconfigurable Optical Add Drop Multiplexer (ROADM) with two optical multiplexers and two optical demultiplexers.

Additionally, a given wavelength routing plane may contain multiple optical multiplexers and multiple optical demultiplexers. A wavelength routing plane 1200 of an optical node containing a directionless two-degree ROADM 1210, two optical multiplexers 1291a-b and two optical demultiplexers 1292a-b is shown in FIG. 12. When using optical demultiplexers having colored add/drop ports, each of the k number of drop ports of the first optical demultiplexer 1292a is able to drop its dedicated wavelength from either the West interface 1260 or the East interface 1261, independent of the drop port of the same dedicated wavelength of the second optical demultiplexer 1292b. Similarly, when using optical demultiplexers having colored add/drop ports, each of the k number of drop ports of the second optical demultiplexer 1292b is able to drop its dedicated wavelength from either the West interface 1260 or the East interface 1261, independent of the drop port of the same dedicated wavelength of the first optical demultiplexer 1292a. Also, when using optical multiplexers having colored add/drop ports, each of the k number of add ports of the first optical multiplexer 1291a is able to forward its dedicated wavelength to either the West interface 1260 or the East interface 1261 or to both the West and East interfaces simultaneously. Similarly, when using optical multiplexers having colored add/drop ports, each of the k number of add ports of the second optical multiplexer 1291b is able to forward its dedicated wavelength to either the West interface 1260 or the East interface 1261 or to both the West and East interfaces simultaneously.

Since the wavelength routing plane 1200 allows for a first wavelength of a first wavelength frequency with a first data payload to be forwarded out a first optical degree, while simultaneously allowing for a first wavelength of the first wavelength frequency with a second data payload to be forwarded out a second degree, we can state that the wavelength routing plane supports colored-directionless-contentionless add ports. That is to say, the ROADM prevents any contention between the two wavelengths of the same wavelength frequency, as long as the wavelengths are forwarded out two different optical degrees. Similarly, if a first wavelength of a first wavelength frequency with a first data payload arrives at a first optical degree and can be forwarded to either a first optical demultiplexer supporting an optical drop of the first wavelength frequency or to a second optical demultiplexer supporting an optical drop of the first wavelength frequency, while simultaneously if a first wavelength of a first wavelength frequency with a second data payload arrives at a second optical degree and can be forwarded to either the first optical demultiplexer supporting an optical drop of the first wavelength frequency or to the second optical demultiplexer supporting an optical drop of the first wavelength frequency, then as long as the first wavelength of the first wavelength frequency with the second data payload is not forwarded to the same optical demultiplexer as the first wavelength of the first wavelength frequency with the first data payload was sent to, then we can state that the wavelength routing plane supports colored-directionless-contentionless drop ports.

In order to provide equipment redundancy, an optical node may be constructed with two or more of the wavelength routing planes 1200. If this is done, the first transmitter of a transmitter protection pair would be attached to one of the add ports of one of the two optical multiplexers of a first wavelength routing plane, and the second transmitter of the transmitter protection pair would be attached to one of the add ports of one of the two optical multiplexers of a second wavelength routing plane. Similarly, a first receiver of a receiver protection pair would be attached to one of the drop ports of one of the two optical demultiplexers of a first wavelength routing plane, and the second receiver of the receiver protection pair would be attached to one of the drop ports of one of the two optical multiplexers of a second wavelength routing plane.

In general, a given wavelength routing plane within an optical node may comprise of: a ROADM having any number of optical degrees, and any number of optical multiplexers (with any number and any type of add ports), and any number of optical demultiplexers (with any number and any type of drop ports).

Optical Networks Constructed with Wavelength Routing Planes

Figure 13:
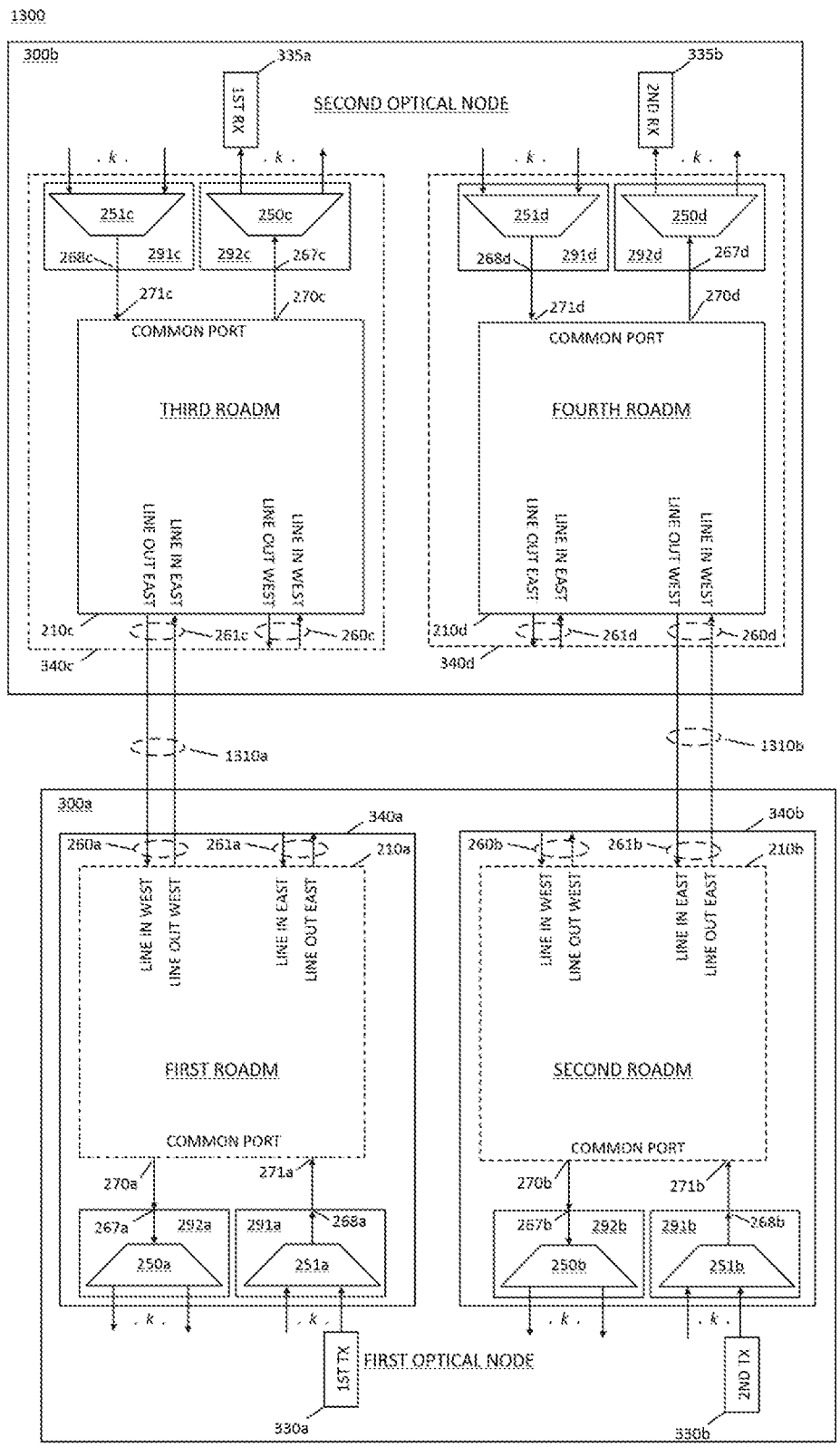
FIG. 13 is an illustration of an optical network comprising of two optical nodes.

FIG. 13 illustrates an optical network 1300 comprising, a first optical node 300*a*, a second optical node 300*b*, a first optical path 1310*a*, and a second optical path 1310*b*. The first optical node 300*a* and the second optical node 300*b* can be the same as—for example—the optical node 300 shown in FIG. 3, although they are not limited thereto. The first optical node 300*a* comprises: a first wavelength routing plane 340*a*, a second wavelength routing plane 340*b* unconnected to the first wavelength routing plane 340*a*, a first optical transmitter 330*a* connected to the first wavelength routing plane 340*a*, and a second optical transmitter 330*b* connected to the second wavelength routing plane 340*b*. The second optical node 300*b* comprises, a third wavelength routing plane 340*c*, a fourth wavelength routing plane 340*d* unconnected to the third wavelength routing plane 340*c*, a first optical receiver 335*a* connected to the third wavelength routing plane 340*c*, and a second optical receiver 335*b* connected to the fourth wavelength routing plane 340*d*. The first optical path 1310*a* connects the first wavelength routing plane 340*a* to the third wavelength routing plane 340*c*, and the second optical path 1310*b* connects the second wavelength routing plane 340*b* to the fourth wavelength routing plane 340*d*. (The first optical path and the second optical path may each comprise of a pair of optical fibers.) The first optical transmitter 330*a* is operable to send a first signal to the first optical receiver 335*a* through the first optical path 1310*a* using a first wavelength, and the second optical transmitter 330*b* is operable to send a second signal to the second optical receiver 335*b* through the second optical path 1310*b* using a second wavelength.

In the network 1300, the first signal comprises a first data payload, and the second signal comprises a second data payload, wherein the second data payload is the same as the first data payload. Therefore, the first optical transmitter 330*a* and the second optical transmitter 330*b* are a transmitter protection pair, and the first optical receiver 335*a* and the second optical receiver 335*b* are a receiver protection pair.

In the optical network 1300, the first wavelength routing plane 340*a* comprises: a first ROADM 210*a* having a first optical degree 260*a* and a second optical degree 261*a* and a common add port 271*a* and a common drop port 270*a*, an optical multiplexer 291*a*, and an optical demultiplexer 292*a*.

In the optical network 1300, the second wavelength routing plane 340*b* comprises: a second ROADM 210*b* having a first optical degree 260*b* and a second optical degree 261*b* and a common add port 271*b* and a common drop port 270*b*, an optical multiplexer 291*b*, and an optical demultiplexer 292*b*.

In the optical network 1300, the third wavelength routing plane 340*c* comprises: a third ROADM 210*c* having a first optical degree 260*c* and a second optical degree 261*c* and a common add port 271*c* and a common drop port 270*c*, an optical multiplexer 291*c*, and an optical demultiplexer 292*c*.

In the optical network 1300, the fourth wavelength routing plane 340*d* comprises: a fourth ROADM 210*d* having a first optical degree 260*d* and a second optical degree 261*d* and a common add port 271*d* and a common drop port 270*d*, an optical multiplexer 291*d*, and an optical demultiplexer 292*d*.

The first ROADM 210*a*, the second ROADM 210*b*, the third ROADM 210*c*, and the fourth ROADM 210*d* can be the same as—for example—the ROADM 210 shown in FIG. 2, although they are not limited thereto.

The first optical degree 260*a* of the first ROADM 210*a* is the first optical degree of the first wavelength routing plane 340*a*, the second optical degree 261*a* of the first ROADM 210*a* is the second optical degree of the first wavelength routing plane 340*a*. The first optical degree 260*b* of the second ROADM 210*b* is the first optical degree of the second wavelength routing plane 340*b*, the second optical degree 261*b* of the second ROADM 210*b* is the second optical degree of the second wavelength routing plane 340*b*. The first optical degree 260*c* of the third ROADM 210*c* is the first optical degree of the third wavelength routing plane 340*c*, the second optical degree 261*c* of the third ROADM 210*c* is the second optical degree of the third wavelength routing plane 340*c*. The first optical degree 260*d* of the fourth ROADM 210*d* is the first optical degree of the fourth wavelength routing plane 340*d*, the second optical degree 261*d* of the fourth ROADM 210*d* is the second optical degree of the fourth wavelength routing plane 340*d*.

The first ROADM 210*a* has a first routing means to route wavelengths from the first optical degree 260*a* of the first wavelength routing plane 340*a* to the second optical degree 261*a* of the first wavelength routing plane 340*a*, a second routing means to route wavelengths from the second optical degree 261*a* of the first wavelength routing plane 340*a* to the first optical degree 260*a* of the first wavelength routing plane 340*a*, and a third routing means to route the first wavelength (from 330*a*) to the first optical degree 260*a* of the first wavelength routing plane 340*a* and to the second optical degree 261*a* of the first wavelength routing plane 340*a*.

The second ROADM 210*b* has a fourth routing means to route wavelengths from the first optical degree 260*b* of the second wavelength routing plane 340*b* to the second optical degree 261*b* of the second wavelength routing plane 340*b*, a fifth routing means to route wavelengths from the second optical degree 261*b* of the second wavelength routing plane 340*b* to the first optical degree 260*b* of the second wavelength routing plane 340*b*, and a sixth routing means to route the second wavelength (from 330b) to the first optical degree 260b of the second wavelength routing plane 340b and to the second optical degree 261b of the second wavelength routing plane 340b.

The first routing means may comprise a first wavelength equalizer 205e having only one optical input and only one optical output, and the second routing means may comprise a second wavelength equalizer 205b having only one optical input and only one optical output, and the third routing means comprises a third wavelength equalizer 205c and a fourth wavelength equalizer 205f each having only one optical input and only one optical output.

Figure 14:
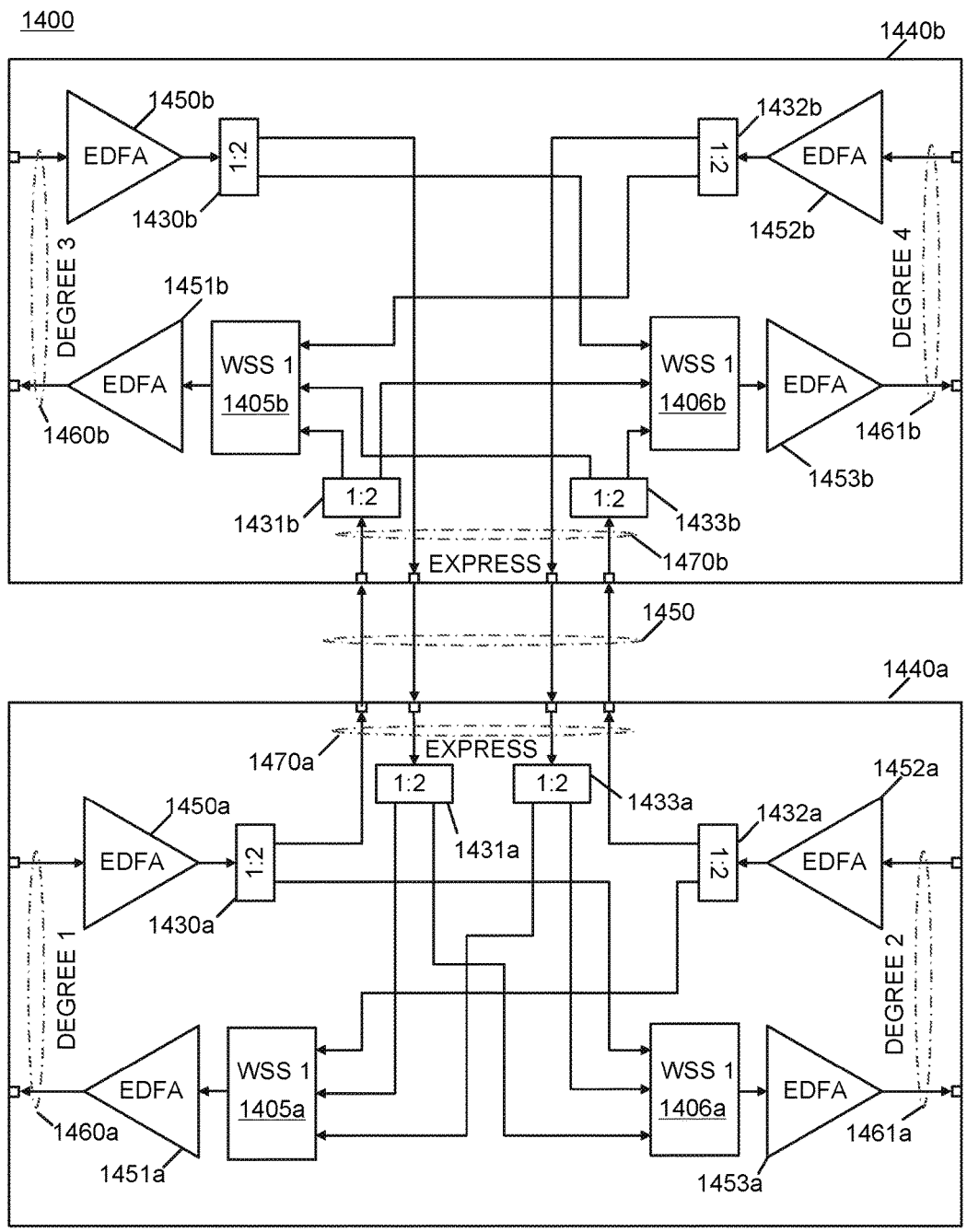
FIG. 14 is an illustration of a fully interconnected mesh four-degree optical node.

FIG. 14 illustrates a four-degree optical node 1400 having a fully interconnected mesh between all four optical degrees. Such an optical node can be constructed many different ways. However, optical node 1400 is constructed using four wavelength selective switches (WSS) 1405a-b and 1406a-b. The optical node 1400 comprises of a first wavelength routing plane 1440a and a second wavelength routing plane 1440b, interconnected with four optical fibers 1450. The first wavelength routing plane 1440a comprises of a first optical degree 1460a, a second optical degree 1461a, a first input optical amplifier 1450a, a first output optical amplifier 1451a, a second input optical amplifier 1452a, a second output optical amplifier 1453a, a first wavelength selective switch 1405a, a second wavelength selective switch 1406a, and four 1 to 2 optical couplers 1430a, 1431a, 1432a, and 1433a. The second wavelength routing plane 1440b comprises of a third optical degree 1460b, a fourth optical degree 1461b, a first input optical amplifier 1450b, a first output optical amplifier 1451b, a second input optical amplifier 1452b, a second output optical amplifier 1453b, a first wavelength selective switch 1405b, a second wavelength selective switch 1406b, and four 1 to 2 optical couplers 1430b, 1431b, 1432b, and 1433b.

Each wavelength selective switch 1405a-b and 1406a-b provides the ability to pass any wavelength received on any of its three optical inputs to its corresponding singular optical output, and provides the ability to block any wavelength received on any of its three optical inputs from its corresponding singular optical output. Therefore, any optical wavelength received at any of its optical degrees can be passed to or blocked from any of the other three optical degrees.

Figure 15:
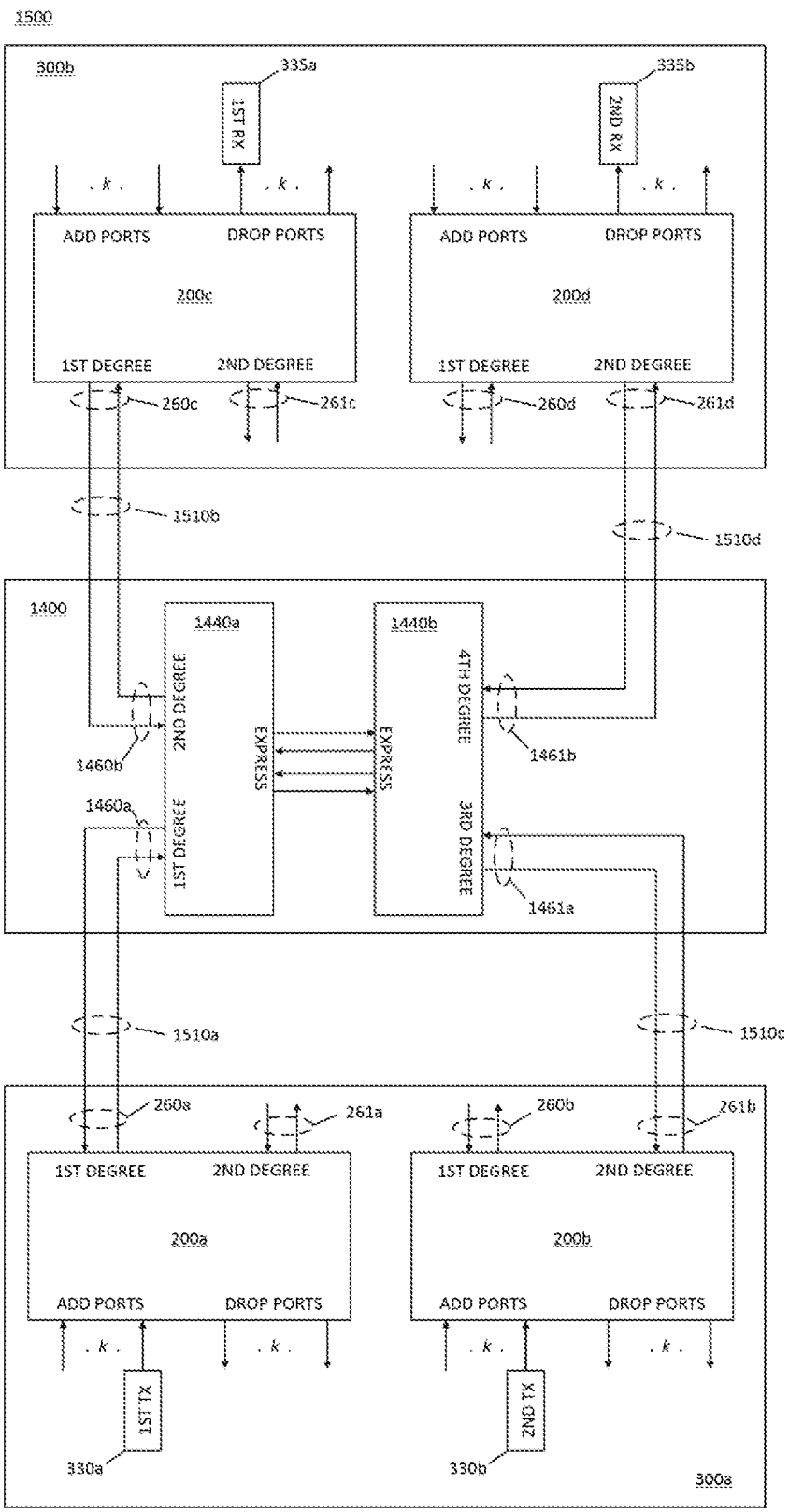
FIG. 15 is an illustration of an optical network comprising of three optical nodes.

FIG. 15 illustrates a network of interconnected optical nodes 1500 including: a first optical node 300a, including: a first wavelength routing plane 200a, a second wavelength routing plane 200b optically unconnected to the first wavelength routing plane 200a, a first optical transmitter 330a connected to the first wavelength routing plane 200a, and a second optical transmitter 330b connected to the second wavelength routing plane 200b; a second optical node 300b, including: a third wavelength routing plane 200c, a fourth wavelength routing plane 200d optically unconnected to the third wavelength routing plane 200c, a first optical receiver 335a connected to the third wavelength routing plane 200c, and a second optical receiver 335b connected to the fourth wavelength routing plane 200d; a third optical node 1400, including: a fifth wavelength routing plane 1440a, a sixth wavelength routing plane 1440b optically connected to the fifth wavelength routing 1440a, where the third optical node 1400 is located on an optical path between the first optical node 300a and the second optical node 300b; a first optical path (i.e., fiber pair) 1510a connecting the first wavelength routing plane 200a to the fifth wavelength routing plane 1440a; a second optical path (i.e., fiber pair) 1510b and connecting the fifth wavelength routing plane 1440a to the third wavelength routing plane 200c; a third optical path (i.e., fiber pair) 1510c connecting the second wavelength routing plane 200b to the sixth wavelength routing plane 1440b; and a fourth optical path (i.e., fiber pair) 1510d connecting the sixth wavelength routing plane 1440b to the fourth wavelength routing plane 200d, where in a first connection scenario, the third optical node 1400 is configurable to route a signal from the first optical transmitter 330a to the first optical receiver 335a, and where in a second connection scenario, the third optical node 1400 is configurable to route the signal from the first optical transmitter 330a to the second optical receiver 335b.

In the first connection scenario, the signal is routed through the first wavelength routing plane 200a, the fifth wavelength routing plane 1440a, and the third wavelength routing plane 200c, and in the second connection scenario, the signal is routed through the first wavelength routing plane 200a, the fifth wavelength routing plane 1440a, the sixth wavelength routing plane 1440b, and the fourth wavelength routing plane 200d.

The first wavelength routing plane 200a, the second wavelength routing plane 200b, the third wavelength routing plane 200c, and the fourth wavelength routing plane 200d can be the same as—for example—the wavelength routing plane 200 shown in FIG. 2, although they are not limited thereto.

The fifth wavelength routing plane 1440a and the sixth wavelength routing plane 1440b can be the same as—for example—the wavelength routing planes 1440a and 1440b shown in FIG. 14, although they are not limited thereto.

FIG. 13 shows how a network of optical nodes 1300 can be partitioned into two optically unconnected network wavelength routing planes across all of the optical nodes of a network. For the optical node 1300, the first network wavelength routing plane comprises wavelength routing planes 340a and 340c, and the second network routing plane comprises wavelength routing planes 340b and 340d. For 1300, any signal inserted into the first network wavelength routing plane with a first transmitter 330a at a first node 300a, will be confined to the first network wavelength routing plane until the signal reaches its corresponding receiver 335a at its destination node 300b. Similarly, any signal inserted into the second network wavelength routing plane with a second transmitter 330b at a first node 300a, will be confined to the second network wavelength routing plane until the signal reaches its corresponding receiver 335b at its destination node 300b. In order to create additional optical paths for a given signal through a network of optical nodes, it is advantageous to permit a given signal to cross from the first network wavelength routing plane to the second network wavelength routing plane at certain key nodes within a network of optical nodes. The network of interconnected optical nodes 1500 allows signals to cross between the two network wavelength routing planes at optical node 1400. For the network of interconnected optical nodes 1500, the first network wavelength routing plane comprises wavelength routing plane 200a, wavelength routing plane 1440a, and wavelength routing plane 200c, while the second network routing plane comprises wavelength routing plane 200b, wavelength routing plane 1440b, and wavelength routing plane 200d. A signal inserted into the first network wavelength routing plane at 200a at a first optical node 300a, can remain in the first network wavelength routing plane until reaching its destination optical node 300b, or the signal can be switched to the second network wavelength routing plane by configuring the WSS devices within the ROADMs contained in optical node

1400. If this is done, then a signal inserted into the first network wavelength routing plane at node 300*a* can exit the second network wavelength routing plane at node 300*b*. Since optical node 1400 provides a means for a signal to cross from a first network wavelength routing plane to a second network wavelength routing plane, optical node 1400 is known as a wavelength routing plane interchange node.

Figure 16:
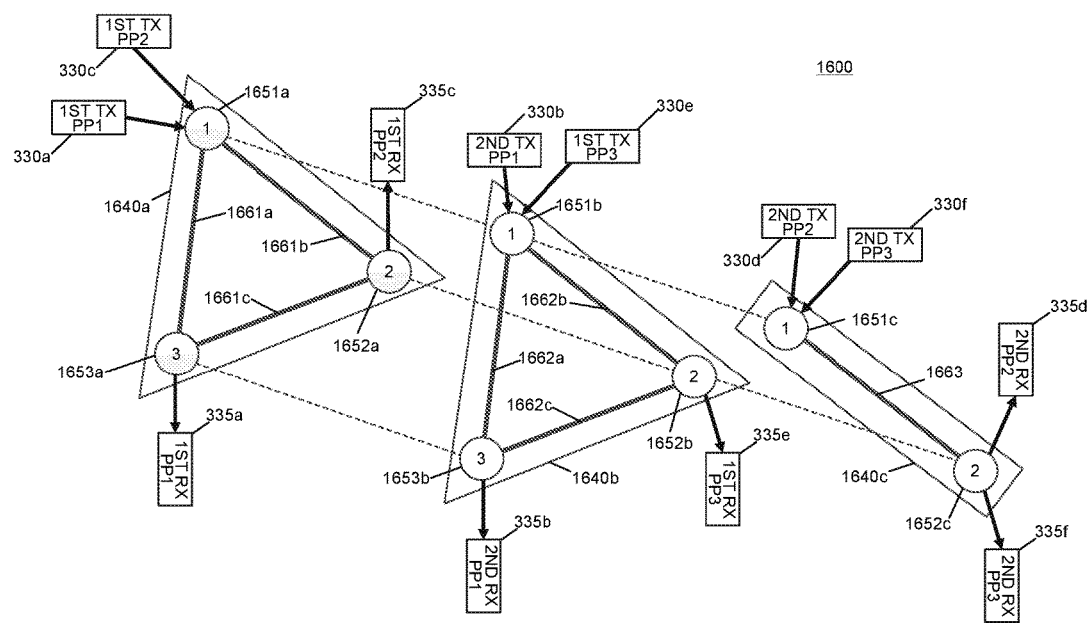
FIG. 16 is illustration of an optical network comprising of three optical nodes.

FIG. 16 is illustration of an optical network 1600 comprising of three optical nodes spread across three network wavelength routing planes (simply referred to as three wavelength routing planes in the context of FIG. 16), wherein none of the three wavelength routing planes are optically connected to one another. FIG. 16 illustrates the case wherein all the wavelength routing planes of a network are not all the same size. The network of optical nodes 1600 comprises: a first wavelength routing plane 1640*a* having three optical nodes 1651*a*, 1652*a*, and 1653*a*; a second wavelength routing plane 1640*b* having three optical nodes 1651*b*, 1652*b*, and 1653*b*; and a third wavelength routing plane 1640*c* having only two optical nodes 1651*c*, 1652*c*, wherein the first optical node 1651*a-c* is spread across the first wavelength routing plane 1640*a* and the second wavelength routing plane 1640*b* and the third wavelength routing plane 1640*c*, and wherein the second optical node 1652*a-c* is spread across the first wavelength routing plane 1640*a* and the second wavelength routing plane 1640*b* and the third wavelength routing plane 1640*c*, and wherein the third optical node 1653*a-b* is only spread across the first wavelength routing plane 1640*a* and the second wavelength routing plane 1640*b*. In FIG. 16, none of the three wavelength routing planes 1640*a-c* are optically interconnected, but instead the three wavelength routing planes are optically independent from one another. The dashed lines in FIG. 16 serve to indicate the portions of the same optical node.

Within a wavelength routing plane, all of the optical nodes are connected together with one another using a pair of optical fibers (one fiber in each direction). Therefore, in the first wavelength routing plane 1640*a*, the first optical node 1651*a* is interconnected to the second optical node 1652*a* using a first optical fiber pair 1661*b*, and the first optical node 1651*a* is interconnected to the third optical node 1653*a* using a second optical fiber pair 1661*a*, and the second optical node 1652*a* is interconnected to the third optical node 1653*a* using a third optical fiber pair 1661*c*. Similarly, in the second wavelength routing plane 1640*b*, the first optical node 1651*b* is interconnected to the second optical node 1652*b* using a first optical fiber pair 1662*b*, and the first optical node 1651*b* is interconnected to the third optical node 1653*b* using a second optical fiber pair 1662*a*, and the second optical node 1652*b* is interconnected to the third optical node 1653*b* using a third optical fiber pair 1662*c*. Similarly, in third wavelength routing plane 1640*c*, the first optical node 1651*c* is interconnected to the second optical node 1652*c* using an optical fiber pair 1663.

In general network 1600 is network of optical nodes comprising: a 1st wavelength routing plane 1640*a* connecting a 1st node 1651*a-c*, a 2nd node 1652*a-c*, and a 3rd node 1653*a-b*; a 2nd wavelength routing plane 1640*b* optically unconnected to the 1st wavelength routing plane 1640*a* and connecting the 1st node 1651*a-c* and the 2nd node 1652*a-c*, and the 3rd node 1653*a-b*; and a 3rd wavelength routing plane 1640*c* optically unconnected to the 1st wavelength routing plane 1640*a* and optically unconnected to the 2nd wavelength routing plane 1640*b* and connecting the 1st node 1651*a-c* and the 2nd node 1652*a-c*, but not the 3rd node 1653*a-b*.

Each optical node 1651*a*, 1652*a*, 1653*a* in the 1st wavelength routing plane 1640*a* contains at least a 1st optical degree and a 2nd optical degree. Each optical node 1651*b*, 1652*b*, 1653*b* on the 2nd wavelength routing plane 1640*b* contains at least a 1st optical degree and a 2nd optical degree. Each optical node 1651*c*, 1652*c* on the 3rd wavelength routing plane 1640*c* contains at least a 1st optical degree. A 1st optical degree of the 1st node 1651*a* on the 1st wavelength routing plane 1640*a* is connected to a 1st optical degree of the 2nd node 1652*a* on the 1st wavelength routing plane 1640*a*, and a 2nd optical degree of the 1st node 1652*a* on the 1st wavelength routing plane 1640*a* is connected to a 1st optical degree of the 3rd node 1653*a* on the 1st wavelength routing plane 1640*a*, and a 2nd optical degree of the 2nd node 1652*a* of the 1st wavelength routing plane 1640*a* is connected to a 2nd optical degree of the 3rd node 1653*a* on the 1st wavelength routing plane 1640*a*, and a 1st optical degree of the 1st node 1651*b* on the 2nd wavelength routing plane 1640*b* is connected to a 1st optical degree of the 2nd node 1652*b* on the 2nd wavelength routing plane 1640*b*, and a 2nd optical degree of the 1st node 1651*b* on the 2nd wavelength routing plane 1640*b* is connected to a 1st optical degree of the 3rd node 1653*b* on the 2nd wavelength routing plane 1640*b*, and a 2nd optical degree of the 2nd node 1652*b* of the 2nd wavelength routing plane 1640*b* is connected to a 2nd optical degree of the 3rd node 1653*b* on the 2nd wavelength routing plane 1640*b*, and a 1st optical degree of the 1st node 1651*c* on the 3rd wavelength routing plane 1640*c* is connected to a 1st optical degree of the 2nd node 1652*c* on the 3rd wavelength routing plane 1640*c*.

Assume that each optical node within each wavelength routing plane comprises of only two add/drop ports, and one wishes to establish one protected connection between the 1st optical node 1651*a-c* and the 3rd optical node 1653*a-b*, and two protected connections between the 1st optical node 1651*a-c* and the 2nd optical node 1652*a-c*. In order to do this, two connections must originate from the 1st optical node on each of the three wavelength routing planes. Since the first connection goes from the first node to the third node, the first wavelength routing plane and the second wavelength routing planes must be used for both halves of the protected connection, since the third wavelength routing plane does not connect to node 3. Then since the first node only has one add/drop port left on the first wavelength routing plane and the second wavelength routing plane, the first wavelength routing plane must be pared with the third wavelength routing plane for one connection, and the second wavelength routing plane must be paired with the third wavelength routing plane for the second connection. This is depicted in FIG. 16. More specifically, the network of optical nodes 1600 further includes: a first optical transmitter of a first transmitter protection pair 330*a* connected to the 1st node 1651*a* on the 1st wavelength routing plane 1640*a*; a second optical transmitter of a first transmitter protection pair 330*b* connected to the 1st node 1651*b* on the 2nd wavelength routing plane 1640*a*; a first optical receiver of a first receiver protection pair 335*a* connected to the 3rd node 1653*a* on the 1st wavelength routing plane 1640*a* and operable to receive a first signal from the first optical transmitter 330*a* of a first transmitter protection pair; a second optical receiver 335*b* of a first receiver protection pair connected to the 3rd node 1653*b* on the 2nd wavelength routing plane 1640*b* and operable to receive a second signal from the second optical transmitter 330*b* of a first transmitter protection pair; a first optical transmitter 330*c* of a second transmitter protection pair connected to the 1st node 1651*a* on the 1st wavelength routing plane 1640*a*; a second optical transmitter 330d of a second transmitter protection pair connected to the 1st node 1651c on the 3rd wavelength routing plane 1640c; a first optical receiver 335c of a second receiver protection pair connected to the 2nd node 1562a on the 1st wavelength routing plane and operable to receive a third signal from the first optical transmitter 330c of a second transmitter protection pair; a second optical receiver 335d of a second receiver protection pair connected to the 2nd node 1652c on the 3rd wavelength routing plane 1640c and operable to receive a fourth signal from the second optical transmitter 330d of a second transmitter protection pair; a first optical transmitter 330e of a third transmitter protection pair connected to the 1st node 1651b on the 2nd wavelength routing plane; a second optical transmitter 330f of a third transmitter protection pair connected to the 1st node 1651c on the 3rd wavelength routing plane 1640c; a first optical receiver 335e of a third receiver protection pair connected to the 2nd node 1652b on the 2nd wavelength routing plane 1640b and operable to receive a fifth signal from the first optical transmitter 330e of a third transmitter protection pair; and a second optical receiver 335f of a third receiver protection pair connected to the 2nd node 1652c on the 3rd wavelength routing plane 1640c and operable to receive a sixth signal from the second optical transmitter 330f of a third transmitter protection pair.

In the network of optical nodes 1600, the first signal includes a first data payload, and the second signal includes the first data payload, and the third signal includes a second data payload, and the fourth signal includes the second data payload, and the fifth signal includes a third data payload, and the sixth signal includes the third data payload.

The 1st optical node 1651a-c and the 2nd optical node 1652a-c and the 3rd optical node can be the same as—for example—the optical node 400 shown in FIG. 4, although they are not limited thereto.

The network of optical nodes 1600 can be said to include a first wavelength routing plane 1640a connecting a first number of optical nodes 1651a, 1652a, 1653a, and a second wavelength routing plane 1640c connecting a second number of optical nodes 1651c, 1652c, where the second number of optical nodes (two) is less than the first number of optical nodes (three), and wherein the first wavelength routing plane 1640a is not optically connected to the second wavelength routing plane 1640c.

Figure 17A:
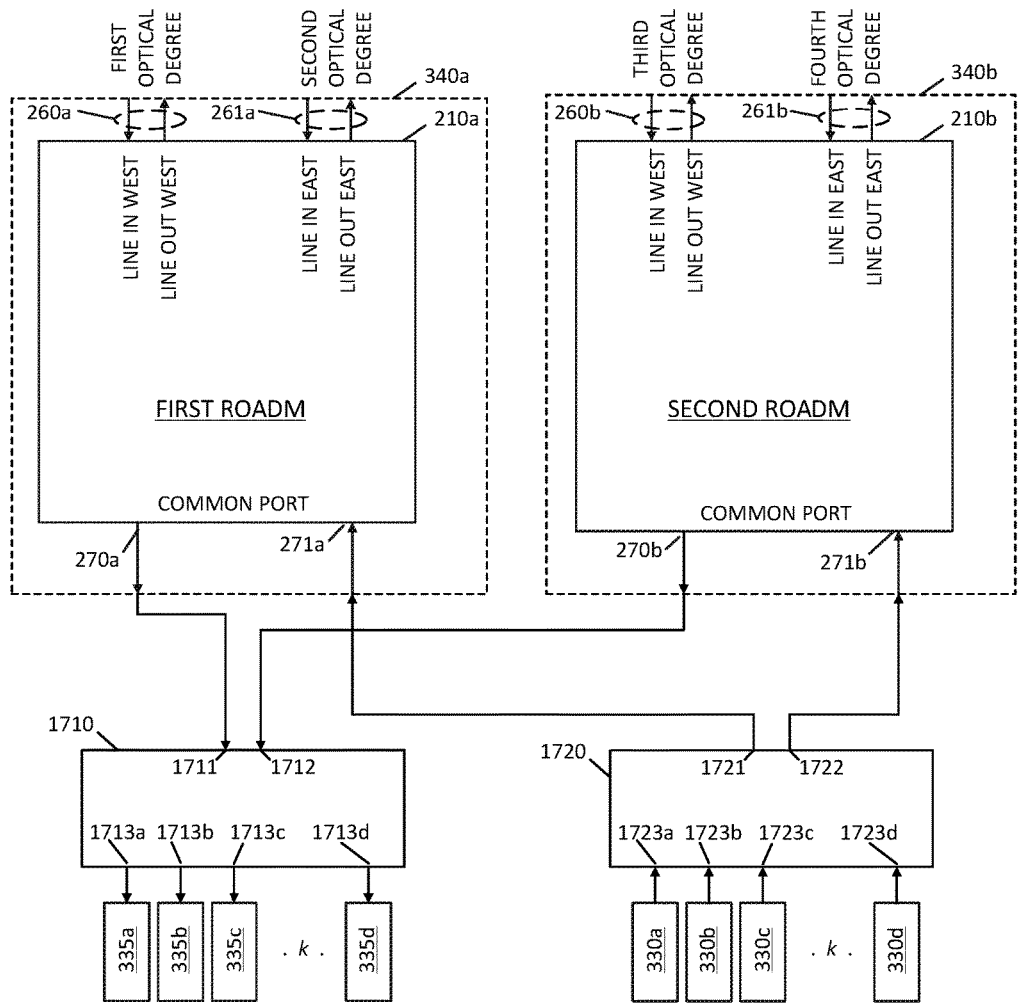
FIG. 17A is an illustration of an optical node with two wavelength routing planes.

FIG. 17A is an illustration of an optical node 1700 with two wavelength routing planes 340a-b. An optical wavelength combiner 1720 and an optical wavelength distributor 1710 reside outside of the two wavelength routing planes 340a-b, and are shared by the two wavelength routing planes 340a-b.

Figure 17B:
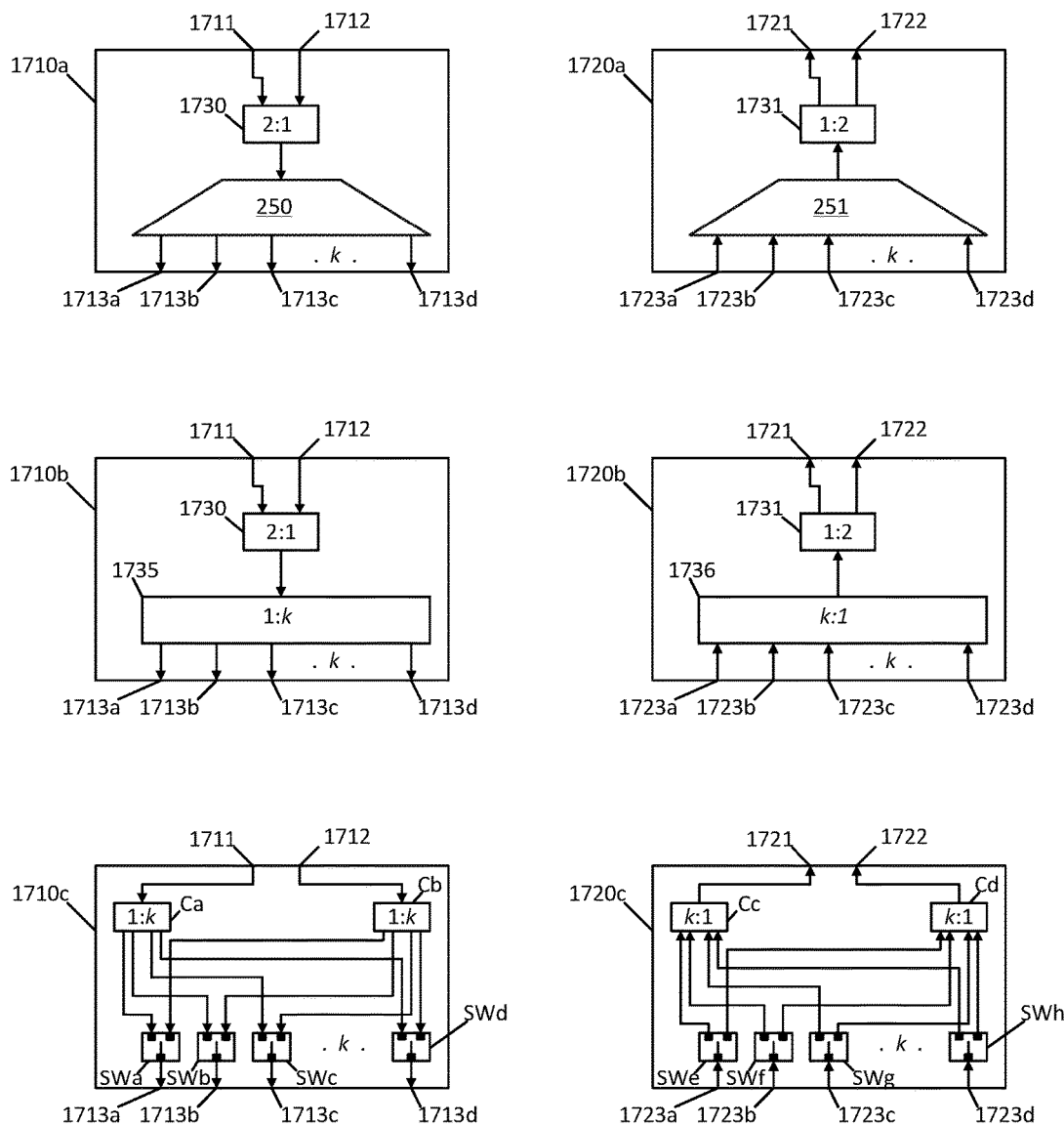
FIG. 17B illustrates various optical wavelength distributors and optical wavelength combiners that can be used within the optical node of FIG. 17A.

The optical wavelength combiner 1720 combines optical wavelengths from the plurality of optical transmitters 330a-d and forwards a first set of optical wavelengths to the first ROADM 210a and forwards a second set of optical wavelengths to the second ROADM 210b. FIG. 17B illustrates three types of optical wavelength combiners 1720a-b.

Optical wavelength combiner 1720a comprises an optical multiplexer 251, a one-to-two optical coupler 1731, a plurality of single wavelength inputs 1723a-d, a first WDM signal output 1721, and a second WDM signal output 1722. The optical multiplexer 251 may be a colored multiplexer that may be implemented with an AWG, or optical multiplexer 251 may be a colorless multiplexer. After the wavelengths are combined by the optical multiplexer 251, the resulting WDM signal is forwarded to the optical coupler 1731. The optical coupler 1731 forwards a copy of the WDM signal out both port 1721 and 1722. Therefore, for the wavelength combiner 1720a, the first set of optical wavelengths sent to the first ROADM 210a is identical to the second set of optical wavelengths sent to the second ROADM 210b.

Optical wavelength combiner 1720b comprises a k-to-1 optical coupler 1736, a one-to-two optical coupler 1731, a plurality of single wavelength inputs 1723a-d, a first WDM signal output 1721, and a second WDM signal output 1722. The optical coupler 1736 is a colorless multiplexer. After the wavelengths are combined by the optical coupler 1736, the resulting WDM signal is forwarded to the optical coupler 1731. The optical coupler 1731 forwards a copy of the WDM signal out both port 1721 and 1722. Therefore, for the wavelength combiner 1720b, the first set of optical wavelengths sent to the first ROADM 210a is identical to the second set of optical wavelengths sent to the second ROADM 210b.

Optical wavelength combiner 1720c comprises two k-to-1 optical couplers Cc and Cd, k number of 1-to-2 optical switches SWe, SWf, SWg, and SWh, a plurality of single wavelength inputs 1723a-d, a first WDM signal output 1721, and a second WDM signal output 1722. The optical wavelength combiner 1720c allows two wavelengths of the same frequency to be applied to any of the optical inputs 1723a-d, and prevents contention between two wavelengths of the same frequency, and therefore is considered a contentionless optical combiner. A given optical switch SWe-h is configured to forward its inputted wavelength to either coupler Cc or coupler Cd. Therefore, if two wavelengths of the same frequency are inputted at 1723a-d, the 1-to-2 optical switch of the first of the two wavelengths must be configured to forward its inputted wavelength to coupler Cc, and the 1-to-2 optical switch of the second of the two wavelengths must be configured to forward its inputted wavelength to coupler Cd, in order to avoid contention between the two wavelengths. Optical coupler Cc combines any wavelengths forwarded to it by the plurality of optical switches SWe-h, and forwards the combined wavelengths to port 1721, while optical coupler Cd combines any wavelengths forwarded to it by the plurality of optical switches SWe-h, and forwards the combined wavelengths to port 1722. Therefore, for the wavelength combiner 1720c, the first set of optical wavelengths sent to the first ROADM 210a may not be identical to the second set of optical wavelengths sent to the second ROADM 210b.

The optical structure within 1720c may be expanded to support j number of output ports, wherein j>2, by expanding 1720c to include j number of k-to-1 couplers, and by using 1-to -j optical switches in place of the 1-to-2 optical switches. Ideally for a four-degree optical node, such as illustrated in FIG. 17A, a given contentionless optical wavelength combiner 1720c should support at least j=4, and each ROADM 210a-b should comprise two directionless add/drop ports 270a-b, 271a-b, instead of only one. This would allow each optical transmitter 330a-d to access any degree of the four degrees, as long as only one wavelength of a given frequency is forwarded to any given degree.

The optical wavelength distributor 1710 distributes optical wavelengths to the plurality of optical receivers 335a-d from a first set of optical wavelengths from the first ROADM 210a and from a second set of optical wavelengths from the second ROADM 210b. FIG. 17B illustrates three types of optical wavelength distributors 1710a-b.

Optical wavelength distributor 1710a comprises an optical demultiplexer 250, a two-to-one optical coupler 1730, a plurality of single wavelength outputs 1713a-d, a first WDM signal input 1711, and a second WDM signal input 1712.

The optical demultiplexer 250 may be a colored demultiplexer that may be implemented with an AWG, or optical demultiplexer 250 may be a colorless demultiplexer. Optical coupler 1730 combines a first set of optical wavelengths from the first ROADM 210a with a second set of optical wavelengths from the second ROADM 210b, and forwards the resulting signal to the optical demultiplexer 250. The optical demultiplexer demultiplexes the WDM signal from coupler 1730 into individual wavelengths, that are then forwarded to outputs 1713a-d.

Optical wavelength distributor 1710b comprises a 2-to-1 optical coupler 1730, a 1-to-k optical coupler 1735, a plurality of multi-wavelength outputs 1713a-d, a first WDM signal input 1711, and a second WDM signal input 1712. Optical coupler 1730 combines a first set of optical wavelengths from the first ROADM 210a with a second set of optical wavelengths from the second ROADM 210b, and forwards the resulting signal to the optical coupler 1735. The optical coupler 1735 forwards a copy of all the wavelengths within the WDM stream from coupler 1730 to each of the multiwavelength output ports 1713a-d. The optical receivers 335a-d that are attached to the distributor 1710b must have the ability to extract a single wavelength frequency from the plurality of wavelength frequencies they receive from the optical coupler 1735. This can be accomplished by either embedding a conventional optical filter within each optical receiver, or by using coherent optical receivers.

Optical wavelength distributor 1710c comprises two 1-to-k optical couplers Ca and Cb, k number of 2-to-1 optical switches SWa, SWb, SWc, and SWd, a plurality of multiwavelength outputs 1713a-d, a first WDM signal input 1711, and a second WDM signal input 1712. The optical wavelength distributor 1710c allows a wavelength of a given frequency to be forwarded to the first optical input 1711, while simultaneously allowing a wavelength of an identical frequency to be forwarded to the second optical input 1712. The wavelength distributor 1710c is then constructed to forward wavelengths of identical frequencies (one from each input 1711, 1712) to any two of the output ports 1713a-d, while avoiding contention between the two wavelengths, and therefore 1710c is a contentionless optical wavelength distributor. The 1-to-k optical coupler Ca distributes a copy of all wavelengths received from port 1711 to each of the plurality of optical switches SWa, SWb, SWc, and SWd. Likewise, the 1-to-k optical coupler Cb distributes a copy of all wavelengths received from port 1712 to each of the plurality of optical switches SWa, SWb, SWc, and SWd. Each optical switch SWa-d may then be configured to forward either the wavelengths from input 1711 to its corresponding output port 1713a-d, or forward the wavelengths from input 1712 to its corresponding output port 1713a-d. The optical receivers 335a-d that are attached to the distributor 1710c must have the ability to extract a single wavelength frequency from the plurality of wavelength frequencies they receive from the optical switches SWa-d. This can be accomplished by either embedding a conventional optical filter within each optical receiver, or by using coherent optical receivers. The optical structure within 1710c may be expanded to support j number of input ports, wherein j>2, by expanding 1710c to include j number of 1-to-k couplers, and by using j-to-1 optical switches in place of the 1-to-2 optical switches. Ideally for a four-degree optical node, such as illustrated in FIG. 17A, a given contentionless optical wavelength distributor 1710c should support at least j=4, and each ROADM 210a-b should comprise two directionless add/drop ports 270a-b, 271a-b, instead of only one. This would allow each optical receiver 335a-d to receive a wavelength from any degree of the four degrees.

For each of the Optical wavelength combiners 1720a-c, optical transmitter protection may be achieved by designating one or more of the optical transmitters 330a-d as protection optical transmitters. As an example, optical transmitter 330d could be designated as an optical transmitter used to protect optical transmitters 330a-c. In the event of a failure of any of the optical transmitters 330a-c, optical transmitter 330d would be used to transmit the signal of the failed optical transmitter. This would be done by (not shown) routing the input signal of the failed optical transmitter 330a-c to optical transmitted 330d. For the case of using a version of 1720a with a colored optical multiplexer 251, the protection optical transmitter 330d would transmit using a dedicated protection wavelength frequency. For the case of using optical wavelength combiners 1720b and 1720c, the protection optical transmitter 330d may simply be tuned to the same optical frequency as that of the optical transmitter it is replacing. Protection against the simultaneous failure of more than one optical transmitter may be achieved by designating more than one optical transmitter to protect a plurality of optical transmitters. Therefore, any of the optical wavelength combiners 1720a-c may support m for n optical protection of optical transmitters, wherein m≤n.

For each of the Optical wavelength distributors 1710a-c, optical receiver protection may be achieved by designating one or more of the optical receivers 335a-d as protection optical receivers. As an example, optical receiver 335d could be designated as an optical receiver used to protect optical receivers 335a-c. In the event of a failure of any of the optical receivers 335a-c, optical receiver 335d would be used to receive the signal of the failed optical receiver. For the case of using a version of 1710a with a colored optical demultiplexer 250, the protection optical receiver 335d may receive using a dedicated protection wavelength frequency. For the case of using optical wavelength distributors 1710b and 1710c, the protection optical receiver 335d may receive the same optical frequency as that of the optical receiver it is replacing. Protection against the simultaneous failure of more than one optical receivers may be achieved by designating more than one optical receiver to protect a plurality of optical receivers. Therefore, any of the optical wavelength distributors 1710a-c may support m for n optical protection of optical receivers, wherein m≤n.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:

1. An optical node, comprising:
  a first Reconfigurable Optical Add Drop Multiplexer (ROADM) comprising: a first optical degree, a second optical degree, a first common add port used to add wavelengths to the first optical degree and to the second optical degree, a first wavelength equalizer having only one optical input and only one optical output, and used to pass and block individual wavelengths from the first optical degree to the second optical degree, and a second wavelength equalizer having only one optical input and only one optical output, and used to pass and block individual wavelengths from the second optical degree to the first optical degree;

a second ROADM comprising: a third optical degree, a fourth optical degree, a second common add port used to add wavelengths to the third optical degree and to the fourth optical degree;

a first optical multiplexer comprising: a first wavelength multiplexer, a first plurality of add ports, and a first multiplexer common port connected to the first common add port;

a second optical multiplexer comprising: a second wavelength multiplexer, a second plurality of add ports, and a second multiplexer common port connected to the second common add port;

a first transmitter connected to one port of the first plurality of add ports and emitting a first optical wavelength with a first data payload; and a second transmitter connected to one port of the second plurality of add ports and emitting a second optical wavelength with a second data payload, wherein the second data payload is a copy of the first data payload, wherein the second ROADM is not optically connected to the first ROADM.

2. The optical node of claim 1, further comprising:

a third ROADM comprising: a fifth optical degree, a sixth optical degree, a third common add port used to add wavelengths to the fifth optical degree and to the sixth optical degree;

a third optical multiplexer comprising: a third wavelength multiplexer, a third plurality of add ports, and a third multiplexer common port connected to the third common add port;

a third transmitter connected to one port of the third plurality of add ports and emitting a third optical wavelength with a third data payload; and a fourth transmitter connected to one port of the second plurality of add ports and emitting a fourth optical wavelength with a fourth data payload, wherein the fourth data payload is a copy of the third data payload, wherein the third ROADM is not optically connected to the first ROADM, and wherein the third ROADM is not optically connected to the second ROADM.

3. The optical node of claim 1, wherein the first plurality of add ports are numbered, and wherein the second plurality of add ports are numbered, and wherein the first transmitter and second transmitters are connected to different port numbers.

4. The optical node of claim 1, wherein first optical transmitter emits the first optical wavelength using a first wavelength frequency, and wherein second optical transmitter emits the second optical wavelength using a second wavelength frequency, and wherein the second wavelength frequency is different from the first wavelength frequency.

5. The optical node of claim 1, wherein the first ROADM further comprises a third wavelength equalizer having only one optical input and only one optical output, and used to pass and block individual wavelengths from the first common add port to the first optical degree; and a fourth wavelength equalizer having only one optical input and only one optical output, and used to pass and block individual wavelengths from the first common add port to the second optical degree.

* * * * *